US011651251B2

(12) United States Patent
Chu et al.

(10) Patent No.: US 11,651,251 B2
(45) Date of Patent: May 16, 2023

(54) APPLICATION AND DEVICE RECOMMENDATION ENGINE

(71) Applicant: Citrix Systems, Inc., Fort Lauderdale, FL (US)

(72) Inventors: Xiaolu Chu, Nanjing/Jiangsu (CN); Tie Liu, Nanjing/Jiangsu (CN); Jie Zhuang, Nanjing/Jiangsu (CN); Zongpeng Qiao, Nanjing/Jiangsu (CN)

( * ) Notice: Subject to any disclaimer, the term of this patent is extended or adjusted under 35 U.S.C. 154(b) by 723 days.

(21) Appl. No.: 16/710,728

(22) Filed: Dec. 11, 2019

(65) Prior Publication Data

US 2021/0103831 A1 Apr. 8, 2021

Related U.S. Application Data

(63) Continuation of application No. PCT/CN2019/110004, filed on Oct. 8, 2019.

(51) Int. Cl.
*G06F 9/50* (2006.01)
*G06N 5/04* (2023.01)
(Continued)

(52) U.S. Cl.
CPC ............ *G06N 5/04* (2013.01); *G06F 9/5027* (2013.01); *G06N 20/00* (2019.01); *G06Q 10/06315* (2013.01)

(58) Field of Classification Search
CPC ........ G06N 5/04; G06N 20/00; G06F 9/5027; G06Q 10/06315; H04L 41/0853
See application file for complete search history.

(56) References Cited

U.S. PATENT DOCUMENTS 8,495,193 B2 7/2013 Kuzhiyil et al.
8,745,205 B2 6/2014 Anderson et al.
(Continued)

FOREIGN PATENT DOCUMENTS

CN 110069299 A 7/2019
EP 1760584 A1 3/2007
(Continued)

OTHER PUBLICATIONS

Scott, Cam, "Cross-device experiences with Project Rome—Building Apps for WindowsBuilding Apps for Windows", Oct. 11, 2016, downloaded on Aug. 10, 2017 from https://blogs.windows.com/buildingapps/2016/10/11/cross-device-experience-with-project-rome/[Aug. 10, 2017 9:33:34 AM].
(Continued)

*Primary Examiner* — Sisley N Kim

(57) ABSTRACT

Methods and systems for recommending one or more computing devices for accessing one or more applications are described herein. Resource requirements may be determined for at least one application. Such resource requirements may be, e.g., a display resolution. Computing device attributes may be determined for computing devices capable of executing the application. The resource requirements and/or the computing device attributes may be normalized and/or modified based on machine learning techniques. The machine learning techniques may modify the application resource requirements and/or computing device attributes based on user feedback. Distances between the resource requirements and the computing device attributes may be determined. A recommendation to use a particular preferred computing device may be transmitted based on the distance comparison. The recommendation may be based on the minimum or maximum distance calculated. User feedback regarding the recommendation may be received.

20 Claims, 19 Drawing Sheets

(51) Int. Cl.
   *G06N 20/00* (2019.01)
   *G06Q 10/0631* (2023.01)
   *G06Q 10/06* (2023.01)

(56) References Cited

U.S. PATENT DOCUMENTS

| | | | |
|---|---|---|---|
| 9,497,580 | B1 | 11/2016 | Cudak et al. |
| 11,276,008 | B1* | 3/2022 | Carter ................ G06Q 10/0631 |
| 2004/0154027 | A1 | 8/2004 | Vandewalle et al. |
| 2005/0021712 | A1 | 1/2005 | Chassapis et al. |
| 2007/0078991 | A1 | 4/2007 | Kim |
| 2011/0276961 | A1 | 11/2011 | Johansson et al. |
| 2012/0066607 | A1 | 3/2012 | Song et al. |
| 2012/0209923 | A1 | 8/2012 | Mathur et al. |
| 2012/0254280 | A1 | 10/2012 | Parker, II |
| 2012/0254966 | A1 | 10/2012 | Parker |
| 2013/0061120 | A1 | 3/2013 | Zeine et al. |
| 2013/0061220 | A1 | 3/2013 | Gnanasambandam et al. |
| 2013/0159376 | A1 | 6/2013 | Moore |
| 2014/0032691 | A1 | 1/2014 | Barton et al. |
| 2014/0143785 | A1 | 5/2014 | Mistry et al. |
| 2014/0344446 | A1 | 11/2014 | Rjeili et al. |
| 2014/0359637 | A1 | 12/2014 | Yan |
| 2015/0358392 | A1 | 12/2015 | Ramalingam et al. |
| 2015/0370603 | A1 | 12/2015 | Fuller et al. |
| 2015/0378766 | A1 | 12/2015 | Beveridge et al. |
| 2015/0378771 | A1 | 12/2015 | Tarasuk-Levin et al. |
| 2016/0080475 | A1 | 3/2016 | Singh et al. |
| 2016/0085439 | A1 | 3/2016 | Threlkeld et al. |
| 2016/0127465 | A1 | 5/2016 | Barstow et al. |
| 2016/0134428 | A1* | 5/2016 | Ouyang .................. H04L 69/24 709/204 |
| 2016/0162972 | A1 | 6/2016 | Abramson et al. |
| 2016/0164696 | A1 | 6/2016 | Yuan et al. |
| 2016/0173648 | A1 | 6/2016 | De Angelis et al. |
| 2016/0188371 | A1 | 6/2016 | Munshi et al. |
| 2016/0224364 | A1 | 8/2016 | Herrendoerfer |
| 2016/0292178 | A1 | 10/2016 | Manville et al. |
| 2016/0353245 | A1 | 12/2016 | Kulikov |
| 2016/0378546 | A1 | 12/2016 | Brouwer et al. |
| 2016/0378570 | A1 | 12/2016 | Ljubuncic et al. |
| 2017/0032143 | A1 | 2/2017 | Kong et al. |
| 2017/0185441 | A1 | 6/2017 | Hay et al. |
| 2018/0189087 | A1 | 7/2018 | Palermo et al. |

FOREIGN PATENT DOCUMENTS

| | | |
|---|---|---|
| WO | 2014078809 A1 | 5/2014 |
| WO | 2016/015519 A1 | 2/2016 |

OTHER PUBLICATIONS

"Use Continuity to connect your Mac, iPhone, iPad, iPod touch, and Apple Watch", downloaded Aug. 10, 2017 from https://support.apple.com/en-us/HT204681[Aug. 10, 2017 10:19:24 AM].

"Use AirPlay or AirPlay Mirroring on you iPhone, iPad, or iPod touch", downloaded Aug. 10, 2017 from https://support.apple.com/en-us/HT204289[Aug. 10, 2017 10:21:48 AM].

Farrugia, Simon, "Have you heard about Crystal Palace on the grapevine?", Oct. 8, 2013, downloaded Aug. 10, 2017 from https://www.citrix.com/blogs/2013/10/08/have-you-heard-about-crystal-palace-on-the-grapevine/[Aug. 10, 2017 10:15:26 AM].

"Sessions", Jan. 7, 2016, downloaded on Aug. 10, 2017 from https://docs.citrix.com/en-us/xenapp-and-xendesktop/7-7/manage-deployment/sessions.html.

Aug. 29, 2018 (WO) International Search Report and Written Opinion—App PCT/US2018/032705.

Jan. 24, 2019—U.S. Non-final Office Action—U.S. Appl. No. 15/629,118.

May 17, 2019—U.S. Non-final Office Action—U.S. Appl. No. 15/629,118.

Sep. 13, 2019—U.S. Final Office Action—U.S. Appl. No. 15/629,118.

Jan. 27, 2021—U.S. Non-final Office Action—U.S. Appl. No. 15/629,118.

May 6, 2020—U.S. Non-final Office Action—U.S. Appl. No. 15/629,118.

Sep. 2, 2020—U.S. Non-final Office Action—U.S. Appl. No. 15/629,118.

Jun. 29, 2020—(CN) International Search Report and Written Opinion—App PCT/CN2019/110004.

May 18, 2021—U.S. Final Office Action—U.S. Appl. No. 15/629,118.

Mar. 29, 2022—U.S. Notice of Allownace—U.S. Appl. No. 15/629,118.

Dec. 22, 2021—(EP) First Examination Report—App 18733007.1.

* cited by examiner

Database (403)

device_specs Table (501)

| PK | Userid | integer |
|---|---|---|
| PK | DeviceName | Varchar(256) |
| | SpecificationName | Varchar(256) |
| | SpecificationValue | Varchar(256) | saas_app_specs Table (502)

| PK | ApplicationName | Varchar(256) |
|---|---|---|
| | isMandatory | boolean |
| | SpecificationName | Varchar(256) |
| | SpecificationValue | VarChar(256) | mobile_app_specs Table (503)

| PK | MobileName | Varchar(256) |
|---|---|---|
| | isMandatory | boolean |
| | SpecificationName | Varchar(256) |
| | SpecificationValue | VarChar(256) |

FIG. 5

APPLICATION AND DEVICE RECOMMENDATION ENGINE

CROSS-REFERENCE TO RELATED APPLICATIONS

The present application claims priority to International Application No. PCT/CN2019/110004, filed Oct. 8, 2019, and entitled "Behavior-Based Authentication," which is hereby incorporated by reference as to its entirety.

FIELD

Aspects described herein generally relate to computer networking, remote computer access, multi-device computing environments, and hardware and software related thereto. More specifically, one or more aspects describe herein relate to multi-device computing environments in a network.

BACKGROUND

The increasing affordability and accessibility of computing devices has made it common for users to use a wide variety of computing devices. An employee of a workplace might use a company-issued laptop, a company-issued smartphone, and a personal smartphone in the course of their workday. Those computing devices may have different attributes and use cases. As a result, software applications may also offer different capabilities and user experiences based on the computing device on which they are accessed.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

Given the complexity of modern software applications described above, the wide variety of computing devices available to users, and the nuance of user experience in computing systems, users may have difficulty determining which computing devices to use to access applications (e.g., remote applications). To overcome these and other limitations that will be apparent upon reading and understanding the present specification, aspects described herein are directed towards recommending one or more computing devices, of a plurality of computing devices, and one or more applications, of a plurality of applications, for performing steps of a task.

A user may want to complete a task, and that task may comprise a number of steps. For example, an employee may submit a receipt for reimbursement by creating a digital photo of the receipt, manually inputting in a dollar value associated with the receipt, and submitting both the photo and the dollar value to a database via an accounting application. Each step may be performable via one or more applications. Resource requirements may be determined for each application. Such resource requirements may be, e.g., a display resolution, the presence of a camera, the presence of a touch screen, or the like. Computing device attributes may be determined for a plurality of computing devices capable of executing the one or more applications. These computing device attributes may indicate, e.g., a display resolution of a computing device, whether the computing device has a camera, whether the computing device has a touch screen, or the like. The resource requirements and/or the computing device attributes may be normalized and/or modified (e.g., weighted) based on machine learning techniques that are determined using, e.g., a history of user device selections. This normalization and modification process may be configured to permit comparison of the resource requirements and the computing device attributes. The resource requirements for the one or more applications and the computing device attributes for the one or more computing devices may be compared to determine recommended computing devices and/or applications for performing one or more steps of the task. For example, for one or more steps, distances between the resource requirements and the computing device attributes may be determined using, e.g., one or more distance formulae. A recommendation to use a preferred computing device to access a preferred application for a particular step may be transmitted based on the distances.

Machine learning techniques may modify (e.g., weight) the resource requirements and/or computing device attributes based on user feedback. Based on whether a user used a computing device and/or application in response to a recommendation, the machine learning techniques may be configured to weigh data used in the recommendation process, such as resource requirements and/or computing device attributes. In this manner, the machine learning techniques may improve the quality of the recommendations provided.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIG. 5 shows illustrative tables which may be stored in a device recommendation database.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards recommending preferred computing devices for accessing one or more software applications. Such computing devices may access applications by executing software applications directly, and/or may access applications by accessing remotely-executed applications (e.g., web applications, software-as-a-service applications, virtual applications, or the like, as executed on a server). Computing devices may have different attributes (e.g., screen resolution, bandwidth, processing resources, camera availability/resolution, microphone availability/quality, etc.) which may affect the functionality of one or more applications. For example, a video conferencing application may require a camera, a microphone, and at least 1 Mbps of bandwidth; however, the video conferencing application may further benefit from additional bandwidth, screen resolution, or the like.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect mounting, connecting, coupling, positioning and engaging.

Computing Architecture

Figure 1:
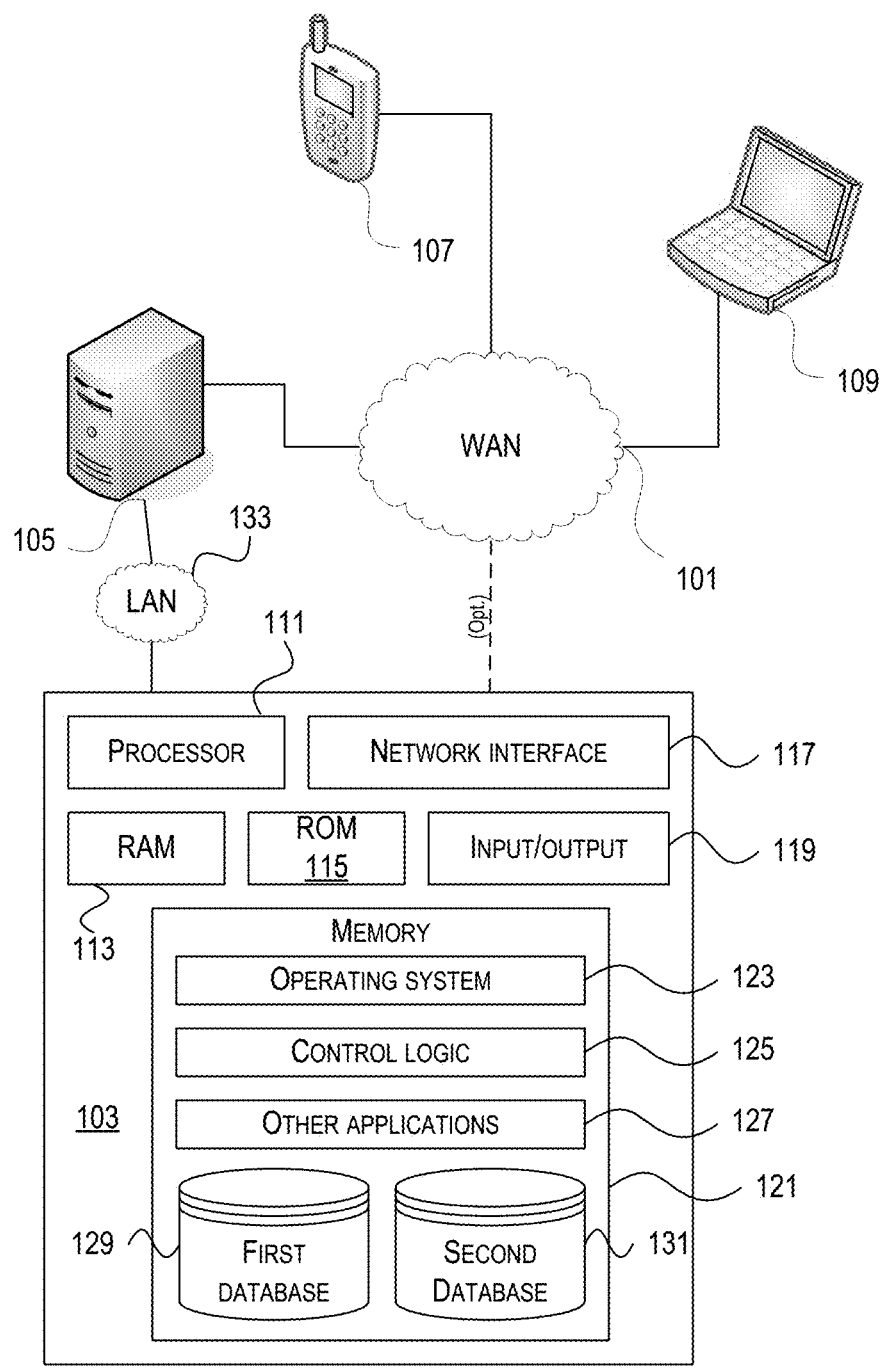
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
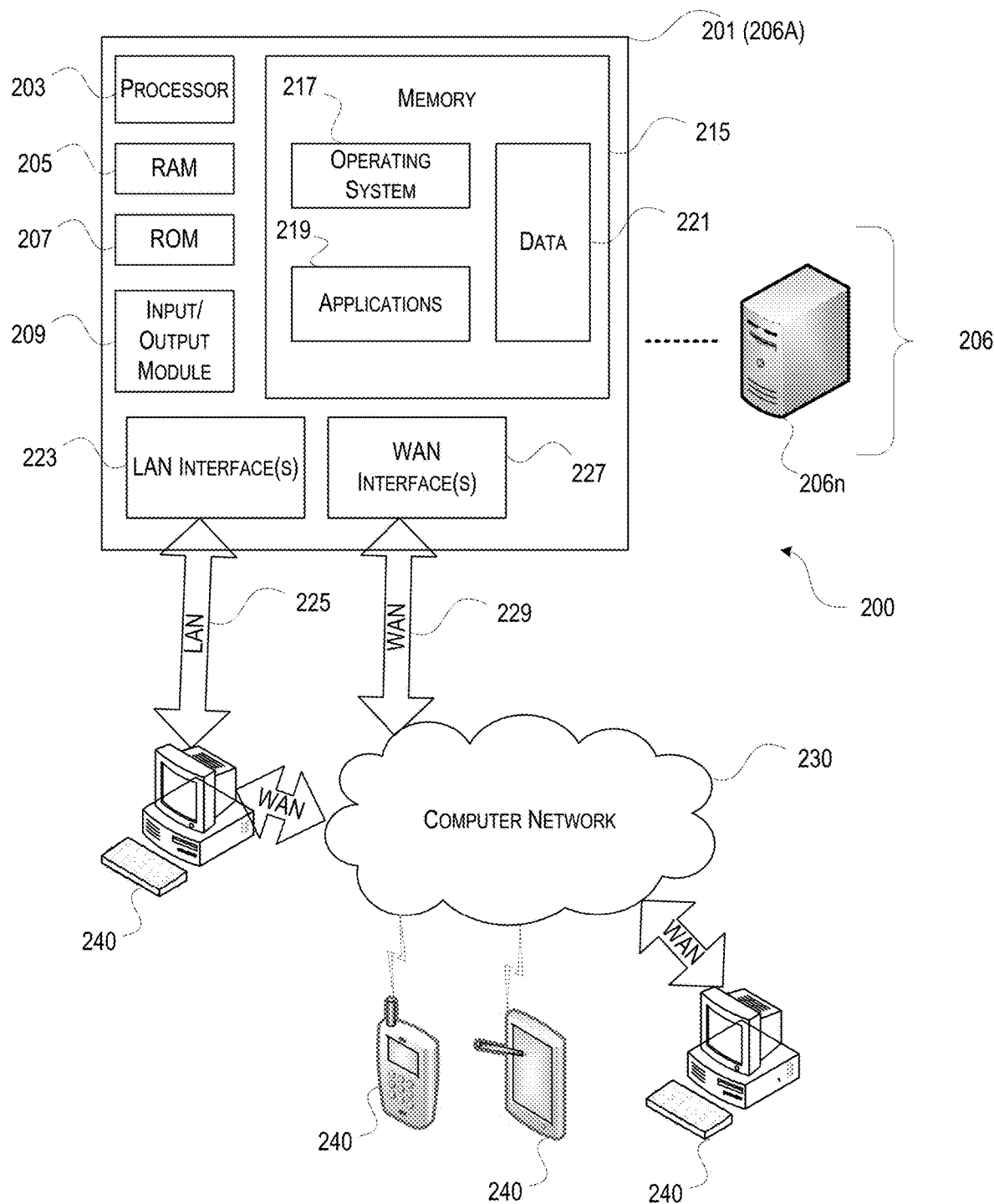
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices and/or client machines). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
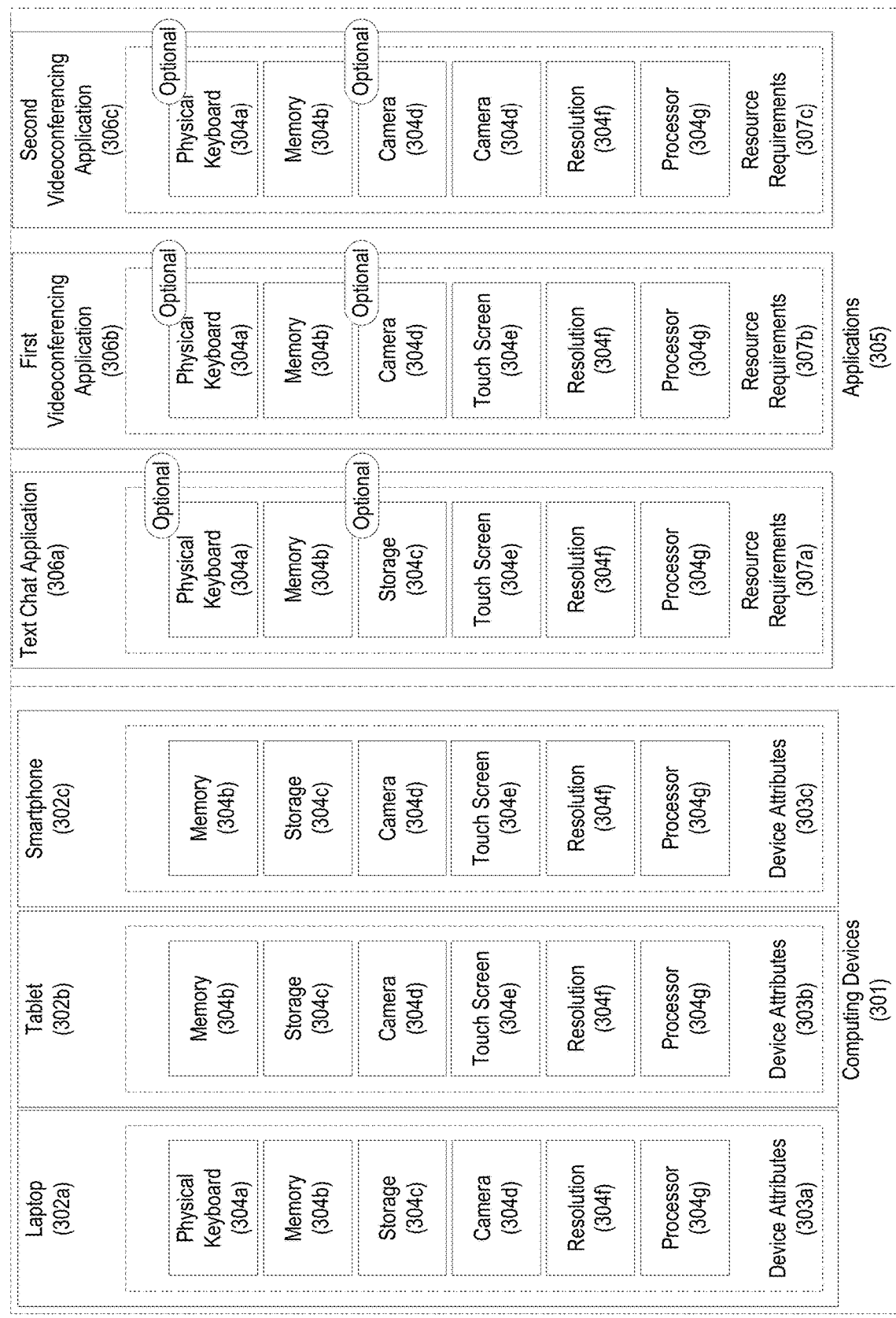
FIG. 3 illustrates relations of computing devices, device attributes, and applications which may execute on the computing devices.

FIG. 3 illustrates a plurality of computing devices 301 (which may additionally and/or alternatively be referred to as endpoint devices) and a plurality of applications 305. The computing devices 301 may be any type of computing device, including, e.g., devices 103, 105, 107, and 109. The computing devices 301 may be associated with a single user (e.g., an employee's laptop) or a plurality of users (e.g., a desktop used by various employees in an organization). The computing devices 301 shown in FIG. 3 include a laptop 302a, a tablet 302b, and a smartphone 302c. The applications 305 include a text chat application 306a, a first videoconferencing application 306b, and a second videoconferencing application 306c. Although three computing devices of the computing devices 301 and three applications of the applications 305 are shown, any number of computing devices and/or applications may be implemented. The computing devices 301 may be divided into different device pools associated with different users, such that a first user may be capable of using a first set of computing devices, but might not be able to use a second set of computing devices.

The computing devices 301 may have attributes. As shown in FIG. 3, the laptop 302a has device attributes 303a including a physical keyboard 304a, memory 304b, storage 304c, a camera 304d, resolution 304f, and processor 304g. The tablet 302b is shown having device attributes 303b including memory 304b, storage 304c, camera 304d, touch screen 304e, resolution 304f, and processor 304g. Like the tablet 302b, the smartphone 302c is shown having device attributes 303c including memory 304b, storage 304c, camera 304d, touch screen 304e, resolution 304f, and processor 304g. The device attributes 303a for the laptop 302a does not include the touch screen 304e because, e.g., the laptop 302a may not have a touch screen installed. The device attributes 303b for the tablet 302b does not include the physical keyboard 304a because, e.g., the tablet 302b may not be connected to a keyboard, but may instead present a virtual keyboard on the touch screen 304e. The device attributes of computing devices may change. For example, a user may connect a webcam to a computing device that does not have a webcam preinstalled. As another example, a user may connect a computing device to an external monitor with a relatively large screen resolution.

The applications 305 may be associated with resource requirements, which may correspond to the device attributes. The device attributes 303a-303c and the resource requirements 307a-307c may thereby be the same or similar: the former may correspond to what a computing device has, whereas the latter may correspond to what an application requires. As shown in FIG. 3, the text chat application 306a has resource requirements 307a including a physical keyboard 304a (which is optional), memory 304b, storage 304c (which is optional), touch screen 304e, resolution 304f, and processor 304g. The first videoconferencing application 306b has resource requirements 307b including a physical keyboard 304a (which is optional), memory 304b, a camera 304d (which is optional), touch screen 304e, resolution 304f, and processor 304g. Similarly, the second videoconferencing application 306c has resource requirements 307c including a physical keyboard 304a (which is optional), memory 304b, a camera 304d (which is optional), touch screen 304e, resolution 304f, and processor 304g. The resource requirements 307a-307c may correspond to one or more of the device attributes 303a-303c, and may be necessary so as to facilitate one or more functions of the applications 305. For example, the first videoconferencing application 306b and the second videoconferencing application 306c may require the camera 304d to facilitate a videoconference. Optional requirements, denoted by bubbles in FIG. 3, may be associated with resource requirements which, if available, may improve functionality and/or user experience for one or more functions of the applications 305. For example, the text chat application 306a may benefit from the physical keyboard 304a, but may be operable without the physical keyboard 304a using a virtual keyboard on the touch screen 304e. As another example, the text chat application 306a may be capable of storing text chat logs if the storage 304c is available.

The device attributes 303a-303c and the resource requirements 307a-307c may correspond to any available functions or capabilities associated with a computing device. The availability of one or more of the device attributes 303a-303c and/or one or more of the resource requirements 307a-307c may be based in part on permissions managed by an operating system executing on a computing device. For example, the laptop 302a may have a camera (e.g., the camera 304d), but the camera may be unavailable to an application unless the application is permitted to access the camera, e.g., by a user. As such, the presence of hardware on a computing device need not suggest that functionality associated with such hardware is available for the computing device and/or for any particular applications.

Though some of the resource requirements 307a-307c may be required for operation of some of the applications 305, the applications 305 may be configured to perform one or more functions without one or more of the resource requirements 307a-307c. For example, the first videoconferencing application 306b may need the camera 304d to perform videoconferencing functions, but may allow users to perform voice conferencing functions without the camera 304d. As another example, the text chat application 306a may be configured to permit users to text chat other users without the storage 304c. Thus, an application may be capable of performing one or more steps in a task even if all resource requirements for the application are not met.

Though the device attributes 303a-303c and the resource requirements 307a-307c are shown in FIG. 3 as being either present or not present with respect to one or more of the computing devices 301 and/or one or more of the applications 305 for simplicity, the device attributes 303a-303c and/or the resource requirements 307a-307c need not be Boolean values. Instead, the device attributes 303a-303c and the resource requirements 307a-307c may correspond to particular values, thresholds, or other requirements. For example, the box corresponding to the processor 304g in the device attributes 303a may indicate that the laptop 302a has a processor with a certain processing capability. As another example, the box corresponding to the resolution 304f in the resource requirements 307a may indicate that the text chat application 306a requires a minimum screen resolution of 1024×768 pixels.

Device Recommendation

Figure 4:
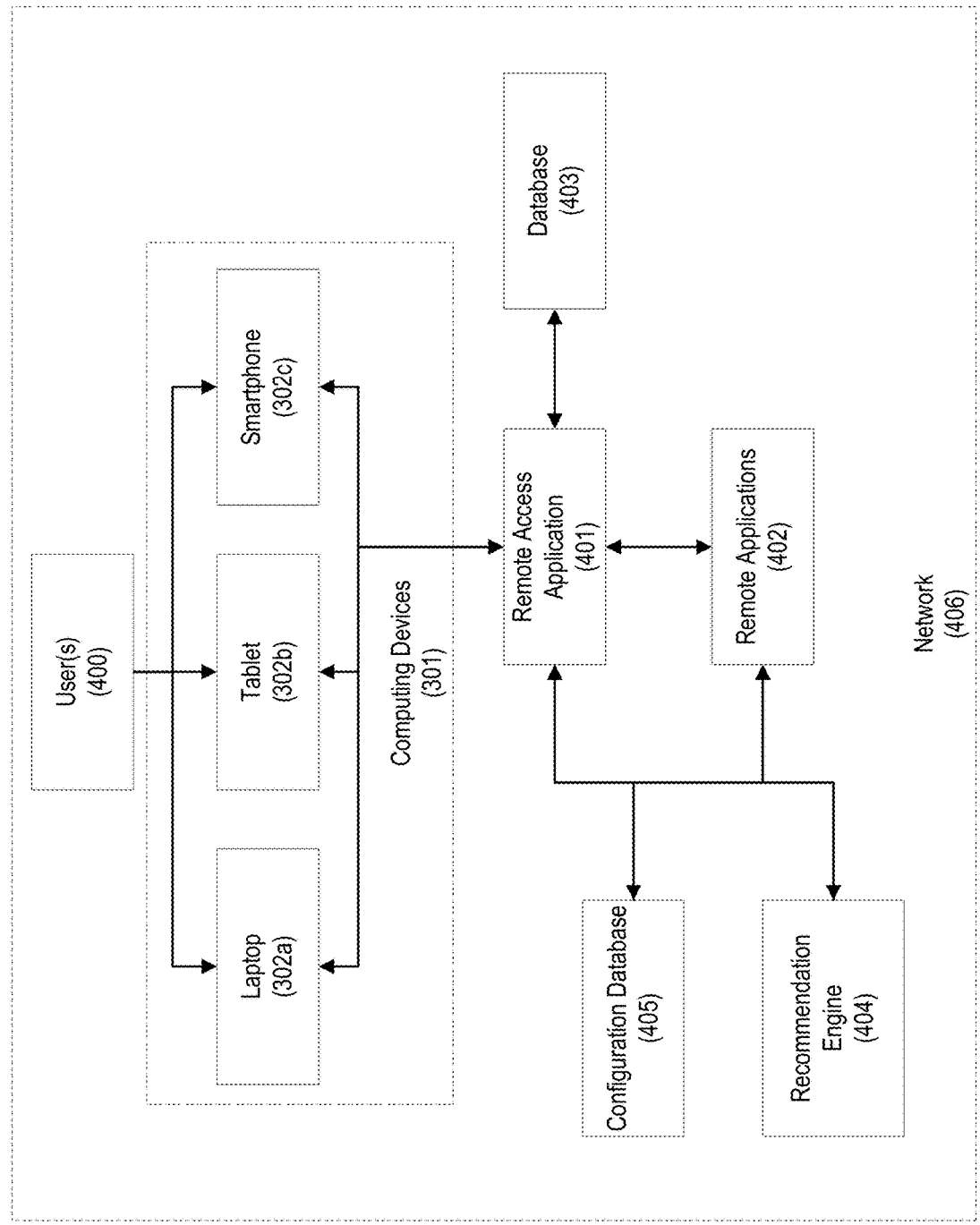
FIG. 4 shows a system for device recommendation in a remote access environment.

FIG. 4 shows a system for device recommendation in a remote access environment. Users 400 may use one or more of the computing devices 301 to connect, e.g., via network 406, to one or more remote applications 402 via a remote access application 401. The remote access application 401 may be stored on and/or execute on one or more of the computing devices 301. The remote access application 401 may provide access, to the users 400, to the one or more remote applications 402. For example, the remote access application 401 may be a program which, when executed, allows users to send input to, and receive output from, the remote applications 402 (as executing on a different computing device, such as a server). The remote access application 401 may also be communicatively coupled to a database 403. The remote access application 401 and/or the remote applications 402 may be communicatively coupled (e.g., via the network 406) to a recommendation engine 404 and an configuration database 405. All or portions of the elements depicted in FIG. 4 may be one or more computing devices, or applications executing on computing devices. For example, the remote access application 401, the one or more remote applications 402, and the database 403 may be part of (e.g., execute on) the same computing device.

The remote access application 401 may be configured to provide the users 400 access to the remote applications 402. The remote access application 401 may receive input from one or more of the computing devices 301 associated with the remote applications 402, and/or transmit output from the remote applications 402 to one or more of the computing devices 301. The remote applications 402 may comprise and/or be the same or similar as the applications 305. For example, the remote applications 402 may be software-as-a-service applications and/or web applications as accessible by a server, and/or may be virtual applications hosted on a virtual server. Though remote applications are depicted in FIG. 4, local applications (e.g., applications which may, in whole or in part, execute on one or more of the computing devices 301) may be used as well. Such local applications may additionally and/or alternatively be referred to as native apps. Such applications may be any size or scope, and may include micro apps, such as small applications (e.g., programmed in Hypertext Markup Language) configured to quickly perform one or more tasks. Additionally and/or alternatively, the remote access applications 401 may comprise applications which execute, in whole or in part, on remote servers. Any or all such applications may be available to one or more of the users 400. For example, a user of the users 400 may use any one of the computing devices 301 to access one or more applications, including the same remotely, and including remotely or locally.

The computing devices 301 may be discovered by one or more devices on the network 406. The users 400 may access a network (e.g., all or portions of the network 406, such as a wireless network) which may provide network connectivity to a plurality of computing devices. Based on determining that one or more computing devices are available on the network, the computing devices may be deemed accessible to the users 400. For example, the remote access application 401 may be configured to periodically query one or more networking devices (e.g., routers, modems) on the network 406 for a list of connected devices.

The recommendation engine 404 may be configured to recommend that one or more of the users 400 use one or more of the computing devices 301 to access one or more applications (e.g., one or more local applications, such as an application executing on one or more of the computing devices 301, or one or more of the remote applications 402). The recommendation engine 404 may thereby select and recommend one or more preferred devices for accessing one or more applications. The recommendation engine 404 may recommend different computing devices of the computing devices 301 and different applications for different steps of a task. As will be detailed further below in regards to FIG. 7, the recommendation engine 404 may make recommendations on which computing device(s), of one or more computing devices, and which application(s) the users 400 should use for one or more steps of a task based on a comparison of one or more resource requirements of one or more applications (e.g., the remote applications 402) and the device attributes of the one or more computing devices. A recommendation associated with one or more computing devices may be provided whether or not one or more application to be executed by the one or more computing devices are remote applications (e.g., such that one or more of the computing devices 301 may access the remote application through the remote access application 401) and/or local applications (e.g., such that the user may execute the same application locally on different computing devices of the computing devices 301).

The configuration database 405 may be configured to store resource requirements of applications, such as the remote applications 402. The configuration database 405 may comprise, for example, an indication of whether an application, of the remote applications 402, requires a camera, a particular screen resolution, or the like. The resource requirements stored in the configuration database 405 may be specified by a publisher of the application. The configuration database 405 may additionally store other information about applications, such as the frequency with which a user uses such applications, a rating of the applications (e.g., as derived from reviews of the applications on an operating system app store), or the like.

The database 403 may be configured to store, e.g., attributes of one or more of the computing devices 301. Such attributes may be retrieved, e.g., from the computing devices 301. For example, the remote access application 401 may be configured to query the computing devices 301 to identify attributes of the computing devices 301. The database 403 may further be configured to store information relating to the use of one or more of the computing devices 301. For example, the database 403 may be configured to store a history of and frequency of use, by a user, of a particular computing device.

FIG. 5 shows illustrative tables in the database 403. The device_specs table 501 comprises a list of devices and their computing device attributes. The saas_app_specs table 502 comprises a list of software-as-a-service applications and their associated resource requirements. The mobile_app_specs table 503 comprises a list of mobile applications and their associated resource requirements. The remote applications 402 in FIG. 4 may comprise both these software-as-a-service applications and mobile applications, among others. While the tables depicted in FIG. 5 comprise exemplary datatypes (e.g., the field Userid being an integer), these datatypes are for illustration only. For example, the Userid field may have a variable character datatype and contain usernames. Also, although two different tables are shown for different types of applications, a single table may be used to store resource requirements for all applications.

The device_specs table 501 may comprise rows correlating users (e.g., a Userid field), computing devices (e.g., a DeviceName field), and computing device attributes (e.g., the SpecificationName and SpecificationValue fields). The Userid field may be an identification of (e.g., a number associated with) one or more users, such as the users 400. The DeviceName field may be an identification of a computing device, such as one or more of the computing devices 301. The SpecificationName and SpecificationValue fields may be a type and value associated with the device attributes 303. For example, in an entry for a computing device in the device_specs table 501, the SpecificationName field may be set to resolution, and the SpecificationValue field may be set to 1920×1080. As another example, in an entry for a computing device in the device_specs table 501, the SpecificationName field may be set to physical keyboard, and the SpecificationValue field may be set to a Boolean value indicating that a physical keyboard is available.

The saas_app_specs table 502 and the mobile_app_specs table 503 may comprise rows correlating applications (e.g., the ApplicationName field) with resource requirements (e.g., the SpecificationName, SpecificationValue, and isMandatory fields), such as the resource requirements 307*a*-307*c*. The saas_app_specs table 502 is associated with software-as-a-service applications, which are identified by the ApplicationName field. The mobile_app_specs table 503 is associated with mobile applications, which are identified by the MobileName field. Like the device_specs table 501, the SpecificationName and SpecificationValue fields in both tables may be a type and value associated with resource requirements (e.g., the resource requirements 307*a*-307*c*). The isMandatory field in both tables indicates whether, for a given resource requirement, it is mandatory for operation of one or more functions of an application. Additionally and/or alternatively, none or all of the resource requirements may be mandatory or optional, such that the isMandatory field need not be used.

Because the SpecificationName and SpecificationValue fields in the device_specs table 501, the saas_app_specs table 502, and the mobile_app_specs table 503 may be the same or similar, the three tables may be used to correlate computing devices (and their computing device attributes) with applications (and their resource requirements, including, e.g., whether or not those resource requirements are mandatory for the operation of one or more functions).

Based on the data stored in the device_specs table 501, the saas_app_specs table 502, and the mobile_app_specs table 503, device attributes may be determined for computing devices, and resource requirements may be determined for applications (e.g., software-as-a-service applications and/or mobile applications). Table 1, below, shows exemplary device attributes for computing devices (e.g., the computing devices 301) and resource requirements for applications (e.g., the applications 305).

TABLE 1

|  | Laptop 302a | Smartphone 302c | Tablet 302b | First Videoconferencing Application 306b | Second Videoconferencing Application 306c |
|---|---|---|---|---|---|
| Camera | 1 MP | 12 MP | 12 MP | 8 MP | 8 MP |
| Resolution | 1920 × 1080 | 1125 × 2436 | 1536 × 2048 | 1125 × 1000 | 1125 × 2048 |
| Touch Screen | No | Yes | Yes | Yes | Yes |

As shown in Table 1, the device attributes include the resolution of a camera, the resolution of a display, and whether or not a touch screen is available. The laptop 302a is shown as having a one megapixel camera, a 1920×1080 display resolution, and no touch screen. The smartphone 302c is shown as having a twelve megapixel camera, an 1125×2436 display resolution, and a touch screen. The tablet 302b is shown as having a twelve megapixel camera, a 1536×2048 display resolution, and a touch screen. The first videoconferencing application 306b is shown as requiring at least an eight megapixel camera, an 1125×1000 display resolution, and a touch screen. The second videoconferencing application 306c is shown as requiring at least an eight megapixel camera, an 1125×2048 screen resolution, and a touch screen.

Figure 6:
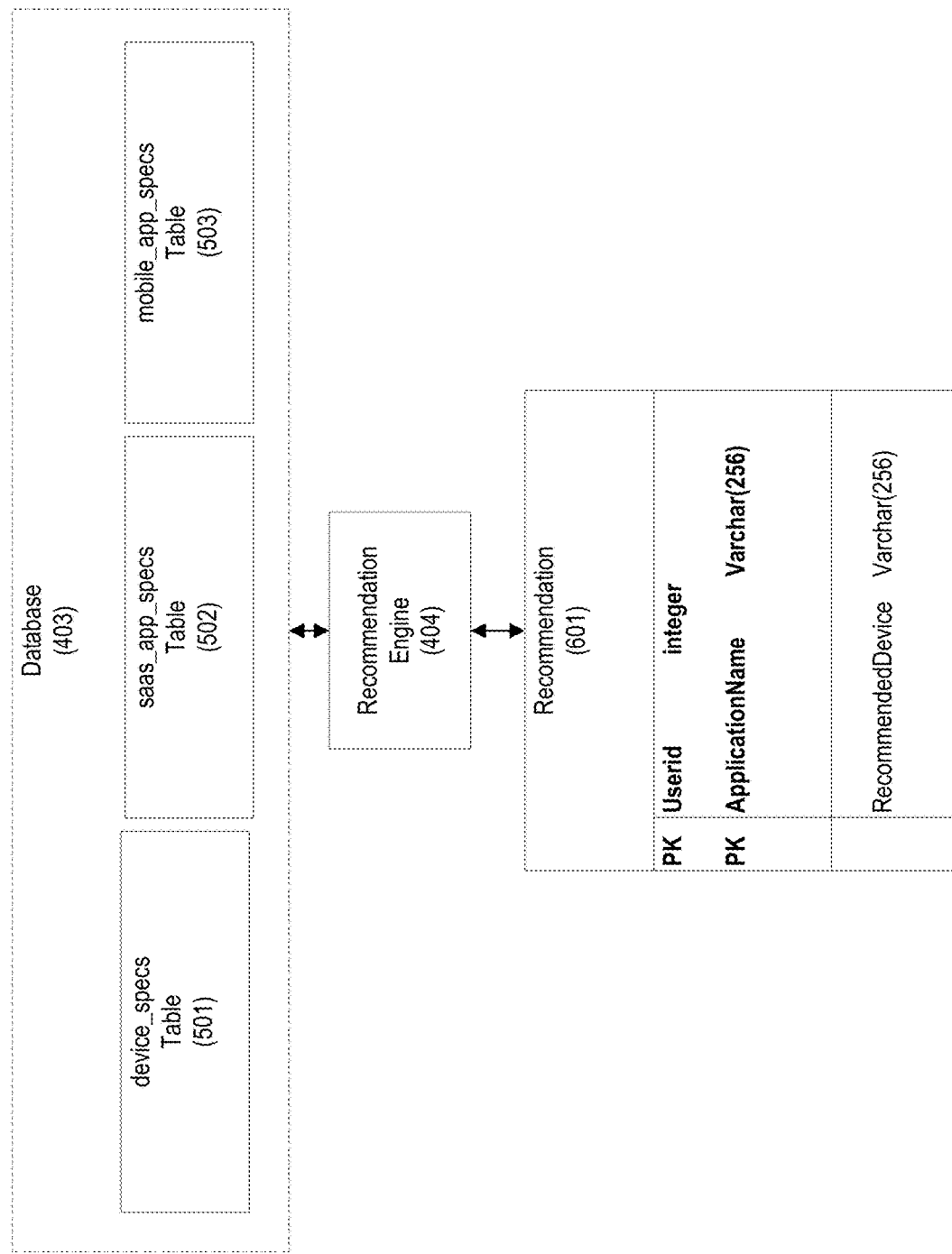
FIG. 6 shows a device recommendation as generated by a device recommendation engine based on computing device attributes and application resource requirements.

FIG. 6 shows how the recommendation engine 404 may use information stored in the database 403 to create a recommendation 601. The database 403 may store the device_specs table 501, the saas_app_specs table 502, and the mobile_app_specs table 503. As will be described in greater detail in FIG. 7, the recommendation engine 404 may use the information in the database 403 to determine the recommendation 601. The recommendation 601 may be any indication of which computing device, of a plurality of computing devices, that a user should use to access (e.g., remotely access, locally execute) one or more applications. For example, a computing device may be configured to display a notification associated with the recommendation 601 (e.g., an indication that the user should access one or more applications on one or more computing devices). As shown in FIG. 6, the recommendation 601 may comprise a table, comprising a field indicating a user (Userid), a field indicating an application (ApplicationName), and a field indicating a recommended device (RecommendedDevice). The recommendation 601 may thereby not only indicate which application should be used, but also the device on which to access the application. The recommendation 601 may additionally and/or alternatively comprise an indication of a plurality of applications and a plurality of computing devices. For example, as will be discussed further below, the recommendation 601 may instruct the user to perform a task comprising multiple steps using a different computing device and/or application for each step.

Figure 7:
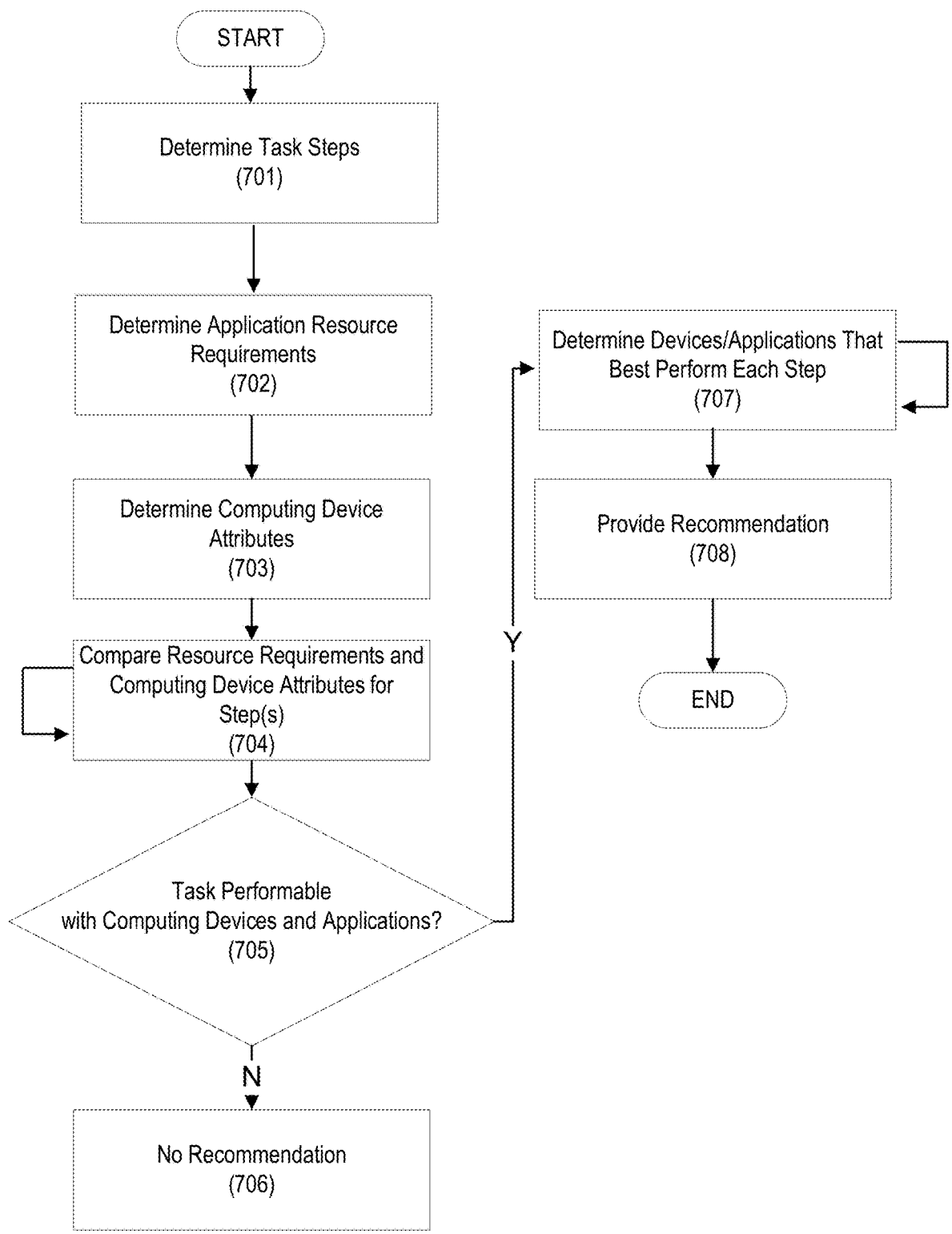
FIG. 7 depicts a flow chart for recommending devices.

FIG. 7 depicts a flow chart for recommending devices. The flow chart shown in FIG. 7 may be all or portions of a process, such as may be executed on one or more computing devices. For example, the steps shown in FIG. 7 may be performed by the remote access application 401 and/or the recommendation engine 404.

In step 701, one or more steps may be determined for performance of a task. A task may comprise one step or multiple steps, and each step may have a function that is to be performed by one or more computing devices and one or more applications. For example, a task involving uploading a photo to a server may comprise first taking the photo (e.g., with a camera application, and using a smartphone), then editing the photo (e.g., using photo editing software executing on a laptop), and uploading the photo (e.g., using a web browser application executing on the laptop). A task may comprise any number of steps, and one or more steps in a task may be performed sequentially and/or in parallel. As will be detailed below, it may be desirable to use different applications and computing devices to perform different steps in a task, even if switching applications and/or computing devices entails a time cost to the user (e.g., a time to find, turn on, log into, and otherwise use a new computing device). Each step may be associated with step requirements, which may specify what must be done to accomplish a task. For example, a step associated with taking a photograph may require that some application, executing on some computing device, use a camera to take a photo. The step requirements may be the same or similar as resource requirements for one or more applications, as discussed further below. Step requirements may be maintained in a database (e.g., the configuration database 405). Such step requirements may be based, at least in part, on a list indicating functions (e.g., steps) which may be performed by different applications.

As part of step 701 (or as part of other steps discussed below, such as step 707), a preference index may be determined for one or more applications and used to determine which applications should be recommended. A preference index may be a value indicating the desirability of an application and may be determined based on, e.g., a count of interactions for each application on each computing device, a ranking of an application (e.g., from an app store on a computing device), or the like. In this way, the performance index may indicate the overall desirability of and user experience associated with an application. For example, the equation below may be used to determine an aggregate preference score for an application which may execute on n different devices:

$$P_{index} = \sum_{i=0}^{n} \theta_{i1} W_i \theta_{i2} P_i$$

The preference index for one or more applications may be determined at any time in FIG. 7. Determining such indexes early in the process depicted in FIG. 7 may advantageously allow for quick filtering of certain applications. For example, applications with unsatisfactory preference indexes may be ignored in various steps of FIG. 7, as such applications may be associated with an undesirable user experience.

In step 702, resource requirements (e.g., the same or similar as the resource requirements 307a-307c) may be determined for one or more applications (e.g., the applications 305) and for the one or more steps determined in step 701. Such resource requirements for the one or more applications may be provided by a developer of the one or more applications. For example, the one or more applications may be bundled with metadata which describes the resource requirements of the application. As another example, resource requirements may be determined over time by monitoring resource use (e.g., processor use, memory use, whether or not a web camera was activated) associated with an application. Some of the resource requirements 307a-307c may be mandatory (e.g., required for operation of the one or more applications), and some of the resource requirements 307a-307c may be optional (e.g., such that they improve performance of the one or more applications, but are not required for operation of one or more functions of the application, and as indicated by the bubbles in FIG. 3). Resource requirements may be important or unimportant for different steps of a task. For example, a first step may have step requirements indicating that the step requires a camera (e.g., to take a photo), whereas a second step may have step requirements indicating that the step may be performed without using a camera (e.g., uploading a photo to a server). In that manner, the same application (e.g., a photo sharing application) may have a resource requirement of a camera, but that particular resource requirement may be unimportant in certain circumstances (e.g., the aforementioned second step).

In step 703, computing device attributes (e.g., the same or similar as the device attributes 303) may be determined for one or more computing devices (e.g., the computing devices 301). Such computing device attributes for the one or more computing devices may be determined by polling an operating system executing on a computing device, by looking up (e.g., in the database 403) manufacturer attributes for the computing device, or the like. For example, computing devices may be configured to provide, upon request, their computing device attributes. Different computing devices may be useful for different steps of a task. For example, a scanner may be useful for a step involving scanning a document, but the same scanner may not be capable of uploading the scanned document to a server. Computing device attributes may depend on the particular step of a task being performed. For example, a smartphone may have adequate permissions to use a camera to take a photo using a first application associated with document scanning, but not a second application associated with social media photo sharing.

Not all computing devices need be analyzed in step 703. As discussed in further detail with reference to FIG. 15, computing devices recently used by a user may be analyzed, whereas computing devices not often used by a user might not be analyzed. A device usage history may be determined (e.g., by receiving use logs from one or more computing devices), and computing devices may be selected based on the device usage history. The device usage history may indicate, for example, the last time a specific computing device was used, a frequency with which a computing device was used, a location of use of the computing device, or the like. For example, devices used by a user within the last year may be considered, but devices not used in the last year need not be considered. As another example, computing devices within a geographic proximity of the user may be considered, but computing distance without that geographic proximity need not be considered. Such device filtering may advantageously avoid recommending old or unavailable devices and may advantageously speed up the process depicted in FIG. 7.

In step 704, for each step, resource requirements for the one or more applications may be compared to the computing device attributes for the one or more computing devices. An exact match between computing device attributes and the resource requirements need not be required for an application and/or a computing device to be required. For example, the comparison may comprise determining that particular resource requirements and particular device attributes match within a threshold.

In step 705, it is determined whether, based on the comparison in step 704, the task determined in step 701 can be performed by one or more computing devices and one or more applications. If not, the flow chart proceeds to step 706, where a recommendation is not provided. Such a result may be the case where there are no computing devices and/or no applications which are capable of performing the task determined in step 701. For example, if a task requires photography, and no available computing devices have a camera, the answer to the determination in step 705 is no. Otherwise, the flow chart proceeds to step 706. Such a circumstance may exist where at least one application can perform all steps associated with the task, and where at least one computing device has attributes which satisfy the at least one application's resource requirements.

In step 707, it may be determined which computing devices, of one or more computing devices, and which applications, of one or more applications, best accomplish the task. Applications may be compared to step requirements to determine which applications best perform the tasks, then computing devices may be selected which have specifications that best fit the application resource requirements. That said, and as will be explained in further detail below, the process need not determine computing devices first or applications first; rather, holistic methods may be used to determine which configuration of one or more computing devices and one or more applications may best perform the steps of the task. A combination of the below methods, in varying orders, may be performed to determine which computing device(s) and which application(s) a user should use to perform one or more steps of a task.

Step 707 may comprise comparing step requirements with application resource requirements to determine which applications, of one or more applications, are capable of completing a task. Not all applications may be capable of performing all steps of a task. For example, a word processing application may be incapable of taking pictures. Some tasks may thereby require different applications be executed at different times. Some applications may be capable of performing multiple steps (e.g., in sequence and/or simultaneously), but may have other drawbacks which make performing multiple steps with that application undesirable. For example, a camera application on a smartphone may be capable of uploading photos to a server, but the uploading functionality may be limited such that it may more desirable to upload images taken using the camera application using a different application.

Step 707 may comprise determining a distance between the vectors of one or more resource requirements of one or more applications and computing device attributes of one or more computing devices. Such a process may advantageously indicate which computing devices are best configured to execute one or more applications. For example, such a process may be used where only one application is capable of performing a step, but where multiple devices are capable of executing the application. As shown below in Table 2, values indicating device attributes for one or more computing devices may be determined.

TABLE 2

|  | Laptop 302a | Smartphone 302c | Tablet 302b |
| --- | --- | --- | --- |
| Camera | 1 | 12 | 12 |
| Resolution | 2,073,600 | 2,740,500 | 3,145,728 |
| Touch Screen | 0 | 1 | 1 |

After such values are determined, the values may be normalized. A variety of formulae may be used, including the min-max normalization formula for rough data, provided below.

$$x' = \frac{x - \min(x)}{\max(x) - \min(x)}$$

The results of such an equation, as applied to the values provided in Table 2 as well as similar values for one or more applications (an exemplary first application and second application), are shown in Table 3.

TABLE 3

|  | Laptop 302a | Smartphone 302c | Tablet 302b | First Application | Second Application |
| --- | --- | --- | --- | --- | --- |
| Camera | −1 | 1 | 1 | 0.63 | 0.63 |
| Resolution | 0.46 | 0.79 | 1 | 0 | 0.58 |
| Touch Screen | 0 | 1 | 1 | 1 | 1 |

Such values may be multiplied by a value, theta (shown in figures and equations as 9), that is determined by a machine learning techniques, as discussed further below. Using these values, distances between the resource requirements of one or more applications to the device attributes of one or more computing devices may be compared. For example, the Minkowski distance formula, provided below, may be used.

$$D(x, y) = \left( \sum_{i=1}^{n} |x_i - y_i|^p \right)^{1/p}$$

An example of such distance calculation is provided by FIG. 8, discussed below.

In the above equation, W refers to an interaction count for each application on the particular computing device, and P refers to a rating score for the application on the computing device. Also in the above equation, theta values may be determined used machine learning techniques, discussed below, to affect the weighting of W and P. Applications may be sorted and compared to other applications based on such preference indexes such that, for example, all other factors being equal, an application with a higher preference index may be recommended over an application with a lower preference index.

Step 707 may comprise determining switching costs associated with switching from one computing device and/or application to another computing device and/or application, and determining a sequence of computing devices and/or applications which minimize the overall time taken by a user to complete a task. For example, a task may require taking a photo and then entering text, and it may be ideal for the photo to be taken using a camera application on a smartphone and the text to be entered using a text processing application executing on a laptop with a physical keyboard. That said, switching from the camera application on the smartphone to the text processing application executing on the laptop may take time: the user might be forced to turn off the smartphone, locate the laptop, turn on the laptop, execute the word processing application, and the like. Thus, for a multi-step task involving multiple steps, the switching cost may be considered in determining whether a user should switch from a first computing device/application to a second computing device/application. Such switching costs may become particularly significant if, for example, multiple switches (e.g., from device to device, and/or from application to application) are required. That said, such switching costs may be preferable if switching computing devices and/or applications results in speedier task completion.

The total time cost of a particular series of computing devices/applications may be represented as a sum of the time on each application as well as the switching cost for switching from one computing device and/or application to another computing device and/or application. For example, the total time expenditure of a user switching from one device to another may be the sum of the time spent on a first application, the time to switch devices (e.g., device start-up time), the time to switch applications (e.g., application boot time), and the time spent on the second application:

$$T_{total_{switch}} = T_{app1_{device1}} + T_{switch_{device}} + T_{switch_{app}} + T_{app2_{device2}}$$

In contrast, using the same device to execute all applications may have a total time expenditure which comprises the sum of all time spend on the applications, including application switching time:

$$T_{total_{noswitch}} = T_{app1_{device1}} + T_{switch_{app}} + T_{app2_{device1}}$$

In the above two equations, it may be desirable to cause the user to switch devices where, e.g., $T_{total_{switch}} < T_{total_{noswitch}}$. In other words, if it is ultimately faster to switch devices to perform all steps than remain on the same device to perform all steps, it may be desirable to recommend that the user switch applications.

The application switching cost may be calculated as a sum of all time costs associated with starting a new application. For example, the below formula indicates that an application switching cost comprises the sum of the time taken to launch the application, the time taken to log in to the application, and the time taken to handle one or more steps of a task in an application.

$$T_{app_{cost}} = T_{launch} + T_{login} + T_{function}$$

The device switching cost may be calculated as a sum of all time costs associated with using a new device. For example, the below formula indicates that that a device switching cost comprises the sum of the time taken to sign into a device (e.g., into a remote access application on the device which entitles the device to access remote applications), the network latency between the device and a server and/or information describing applications (e.g., app stores, such as are available on smartphones).

Timing information may be accounted for using the distance calculation methods discussed above. For example, Table 1 (above) may be modified to reflect the combination of application switching costs and device switching costs, as shown by Table 5, below.

TABLE 5

|  | Laptop 302a | Smartphone 302c | Tablet 302b | First Videoconferencing Application 306b | Second Videoconferencing Application 306c |
| --- | --- | --- | --- | --- | --- |
| Application Switching Cost + Device Switching Cost | 5 s | 3 s | 1 s | 3 s | 3 s |
| Camera | 1 MP | 12 MP | 12 MP | 8 MP | 8 MP |
| Resolution | 1920 × 1080 | 1125 × 2436 | 1536 × 2048 | 1125 × 1000 | 1125 × 2048 |
| Touch Screen | No | Yes | Yes | Yes | Yes |

(e.g., if the device remotely accesses applications), time associated with a workload of the computing device (e.g., time taken for the computing device to read/write to memory, to process data in a processor), and time taken to execute an operating system:

$$T_{device_{cost}} = T_{signon} + T_{latency} + T_{workload} T_{operatingsystem}$$

It may be desirable to cause a user to switch to a different computing device and/or application to avoid excessive delays associated with one or more steps. For example, Table 4, below, indicates a circumstance where switching to a different computing device saves a significant amount of time for a user.

TABLE 4

|  | Step 1 | Step 2 | Step 3 | Step 4 | Cost of switching apps | Cost of switching devices | Total cost |
| --- | --- | --- | --- | --- | --- | --- | --- |
| User Doesn't Switch | 20 s | 10 s | 300 s | 300 s | 0 s | 0 s | 630 s |
| User Switches | 20 s | 10 s | 60 s | 60 s | 3 s | 4 s | 157 s |

Note that the calculations shown in Table 4 may be represented as follows, such that the circumstance where the user doesn't switch is a sum of the time of tasks for a single application, whereas the circumstance where the user does switch entails application switching costs and device switching costs.

$$(T_{user\ doesn't\ switch}) = T_{s1} + T_{s2} + T_{s3} + \ldots T_{sn}$$
$$(T_{user\ switches}) = T_{s1\_on\_app1} + \ldots + T_{sn\_on\_appn} + T_{app\_cost} + T_{device\_cost}$$

The productivity of a user may be measured as a function of the total time cost for performing a task. For example, using the values of Table 4, above, switching devices may have a productivity savings of 473s.

A recommendation need not correspond to the fastest way to perform a task. For example, a computing device and/or application which performs a task the most quickly may nonetheless be associated with an undesirable user experience, such that a user might rather spend a small amount of additional time to avoid the undesirable user experience. Information regarding such undesirable user experiences may be determined using databases comprising reviews and/or information describing applications (e.g., app stores, such as are available on smartphones).

The data in table 5 may be normalized and calculated using distance formulae, as was the case for Table 1. Thus, in some instance, switching times may be treated like device specifications and/or resource requirements.

Step 707 may comprise all or some of the methods discussed above, and in any particular order. For example, step 707 may begin with filtering frequently-used ("hot") computing devices from a list of all computing devices available to a user, then determining all applications available on those devices which may be capable of performing steps of the task (e.g., by comparing step requirements and application resource requirements), then sorting all such applications by a preference index that is based on a frequency of use of the application and/or the rating of the application on app stores, then determining possible paths for the user to take (e.g., determining every possible permutation of performing the task using the applications), then calculating application and device switching costs, then selecting the applications with the greatest preference index and lowest overall time consumption, then using the distance calculations described above to determine the frequently-used computing devices that best executed the selected applications.

In step 708, based on the analysis performed in step 707, one or more applications and one or more computing devices may be recommended. In an instance where only one application is capable of performing a step and/or task, the computing device associated with the least distance from resource requirements of that application (e.g., so that the computing device most closely matches one or more resource requirements) may be recommended. In some instances, a computing device associated with a greater distance may be selected if the greater distance is associated with superior computing device attributes (e.g., a greater resolution, a better quality camera) as compared to other computing devices. Additionally and/or alternatively, the computing device associated with the greatest distance from resource requirements of one or more applications (e.g., such that the computing device exceeds one or more resource requirements) may be recommended. Where multiple applications may be executed to accomplish a task, and/or where time savings may be realized by switching computing devices/applications during performance of different steps of a task, the recommendation may comprise a recommendation to switch applications and/or computing devices. That distance may be associated with the computing device that best satisfies the application resource requirements of one or more applications. The recommendation may be transmitted to a user, e.g., over a network. The recommendation may comprise causing display, for the user, of an indication of the computing device.

The recommendation may be associated with data sharing and/or maintenance. For example, if a recommendation comprises a recommendation to switch from a first computing device executing a first remote application to a second computing device executing the same first remote application, the recommendation may cause a server executing the first remote application to preserve data associated with the user's instance of the first remote application until the user logs in with the second computing device. Thus, for example, a user may be able to preserve an instance of a standalone application to maintain the data transmitted from a first application to a second application.

The process depicted in FIG. 7 may be performed, in whole or in part, using a virtual assistant, such as may be provided on a smartphone or smart speaker. A user may indicate, to the virtual assistant, a task for completion. The process shown in FIG. 7 may be performed. The virtual assistant may use the recommendation provided in step 708 to walk a user through each step of the task. For example, the virtual assistant may inform the user of an application to use, a computing device to use, and initiate preliminary authentication steps (e.g., authenticating the computing device and/or the application with a remote server) to make the user's performance of the task easier. The virtual assistant may be additionally and/or alternatively configured to provide the user information about the task, such as a time savings gained by switching from a first computing device and/or first application to a second computing device and/or second application.

Figure 8:
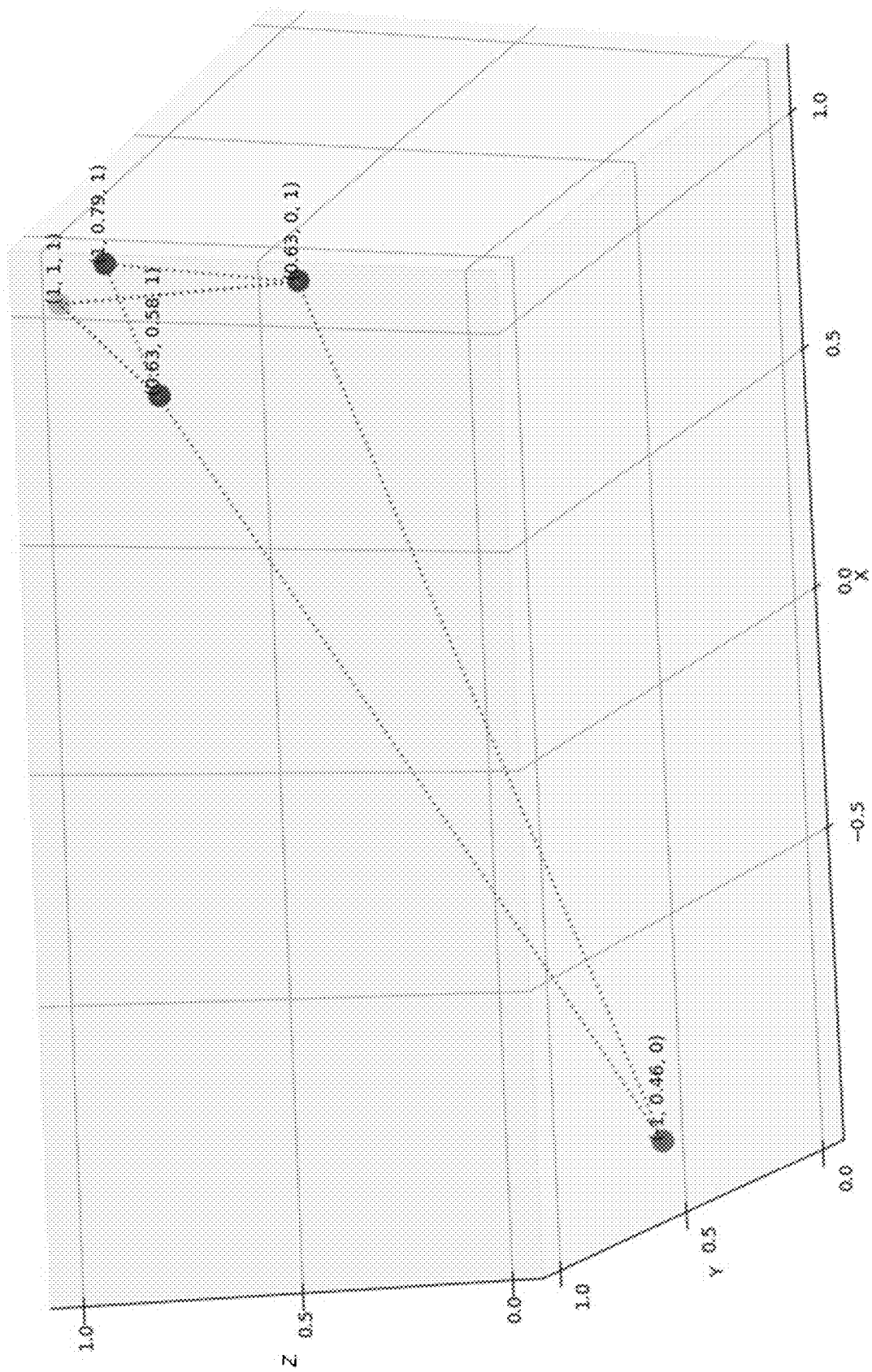
FIG. 8 depicts a plot of computing device attributes and application resource requirements distances.

FIG. 8 depicts a plot 800 of computing device attributes and application resource requirements. In this plot, the x plane corresponds to the normalized camera values in Table 3, the y plane corresponds to the normalized resolution values in Table 3, and the z plane corresponds to the normalized touch screen values in Table 3. Dotted lines indicate distances between the computing devices (represented by dots at {−1, 0.46, 0}, {1, 0.79, 1}, and {1, 1, 1}) and applications (represented by dots at {0.63, 0.58, 1} and {0.63, 0, 1}). In this case, the dot at {1, 1, 1} associated with the tablet 302b is shaded to indicate that it is likely to be recommended in step 708. Such dotted lines may be measured to determine the distances between the various points. As indicated above, from the perspective of an application, the least distant computing device may be recommended for execution of the application.

Figure 9:
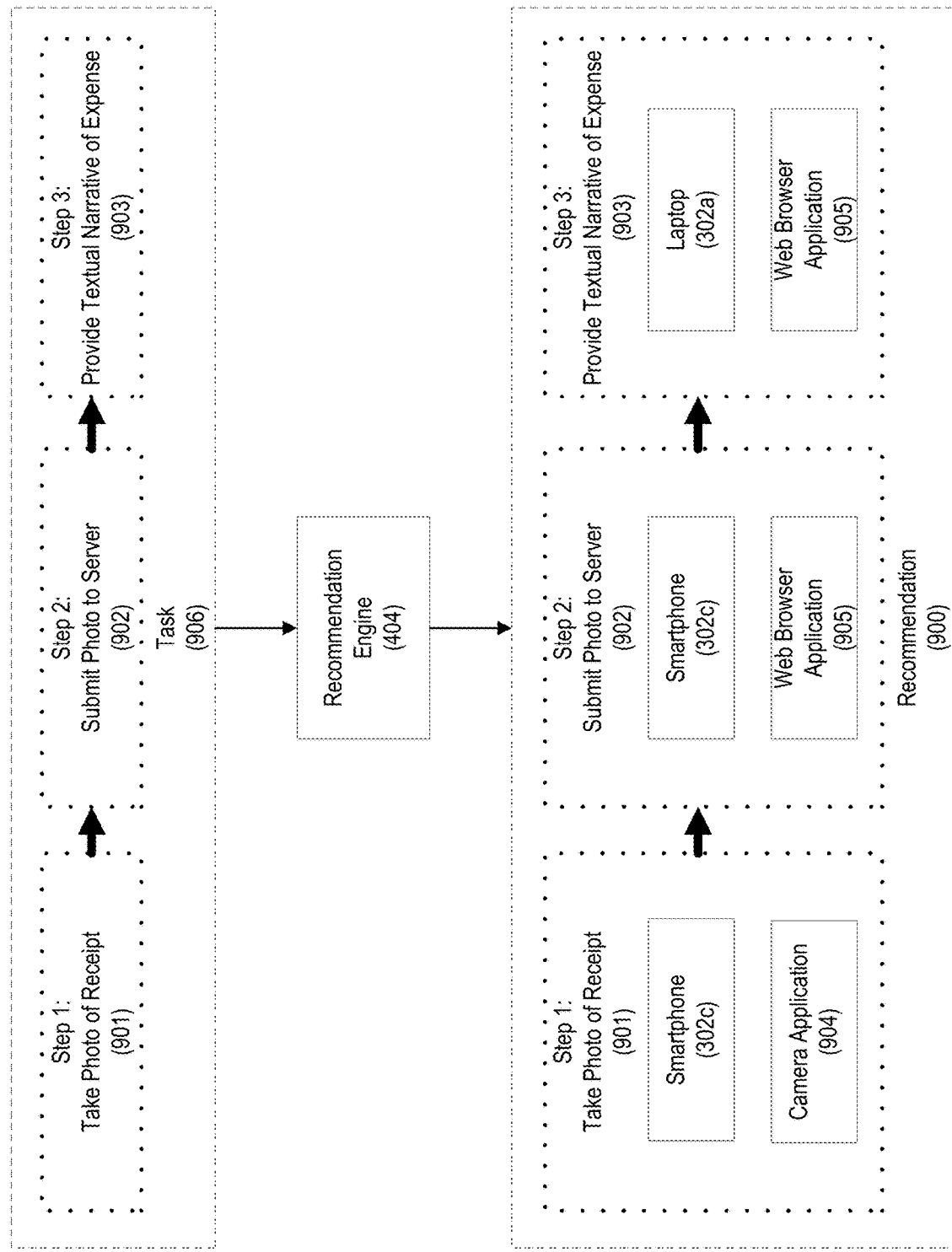
FIG. 9 depicts different steps of a task along with different applications and computing devices which may be recommended to complete those tasks.

FIG. 9 depicts a recommendation 900 for a three-step task for submitting a receipt for reimbursement. A task 906 may comprise a first step 901 of taking a photo of a receipt, a second step 902 of submitting the photo to a server, and a third step 903 of providing a textual narrative explaining the receipt to accompany the photo. As shown in FIG. 9, the recommendation 900, as provided by the recommendation engine 404, may indicate that a user should use a different computing device and/or application for different steps of a task. For the first step 901, the recommendation 900 indicates that the user should use the smartphone 302c and a camera application 904. For the second step 902, the recommendation 900 indicates that the user should use the smartphone 302c and a web browser application 905. For the third step 903, the recommendation 900 indicates that the user should use the laptop 302a and the web browser application 905.

Multi-step recommendations, such as depicted in FIG. 9, may comprise providing a user with step-by-step instructions using one or more computing devices. For example, after completion of the first step 901, the smartphone 302c may display an indication that the user should open the web browser application 905. As another example, after completion of the second step 902, the smartphone 302c may display an indication that the user should begin using the web browser application 905 on the laptop 302a.

Figure 10:
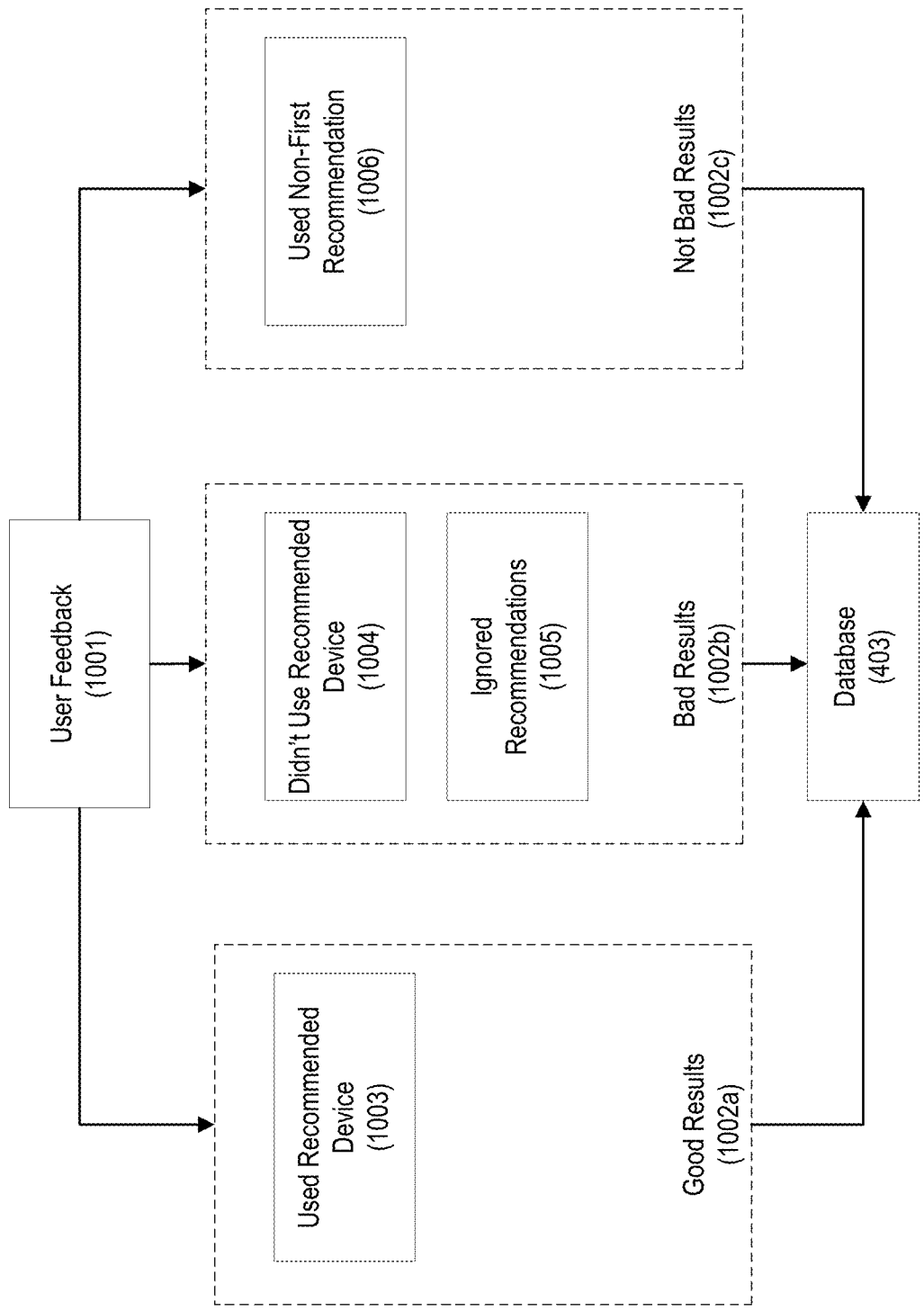
FIG. 10 shows types of user feedback that may be received in response to a device recommendation.

FIG. 10 shows types of user feedback that may be received in response to a recommendation. User feedback 1001 may be received from a user. The user feedback may comprise, e.g., a determination that a user used a particular computing device to access a particular application. For example, the user feedback 1001 may be a determination that, responsive to a recommendation (e.g., the recommendation provided in step 707), the user selected one or more of an available set of computing devices to access a particular application.

The user feedback 1001 may be segregated into good results 1002a, bad results 1002b, and not bad results 1002c. The good results 1002a may correspond to circumstances where the recommendation provided appears to have been correct, such as when the user uses a recommended computing device (as indicated by box 1003) and/or a recommended application. The bad results 1002b may include instances where it appears that the recommendation provided was not correct, such as when a user doesn't use a recommended device/application at all (as indicated by box 1004) and/or when a user ignores the recommendation (as indicated by box 1005). The not bad results 1002c may be circumstances where it is unclear whether the recommendation was correct or not, such as where a user uses a secondary computing device/application recommendation (as indicated by box 1006).

The user feedback 1001 may be stored in the database 403. A machine learning processes may use the user feedback 1001, whether or not stored in the database 403, to improve recommendations, as described further below in relation to FIG. 11.

Figure 11:
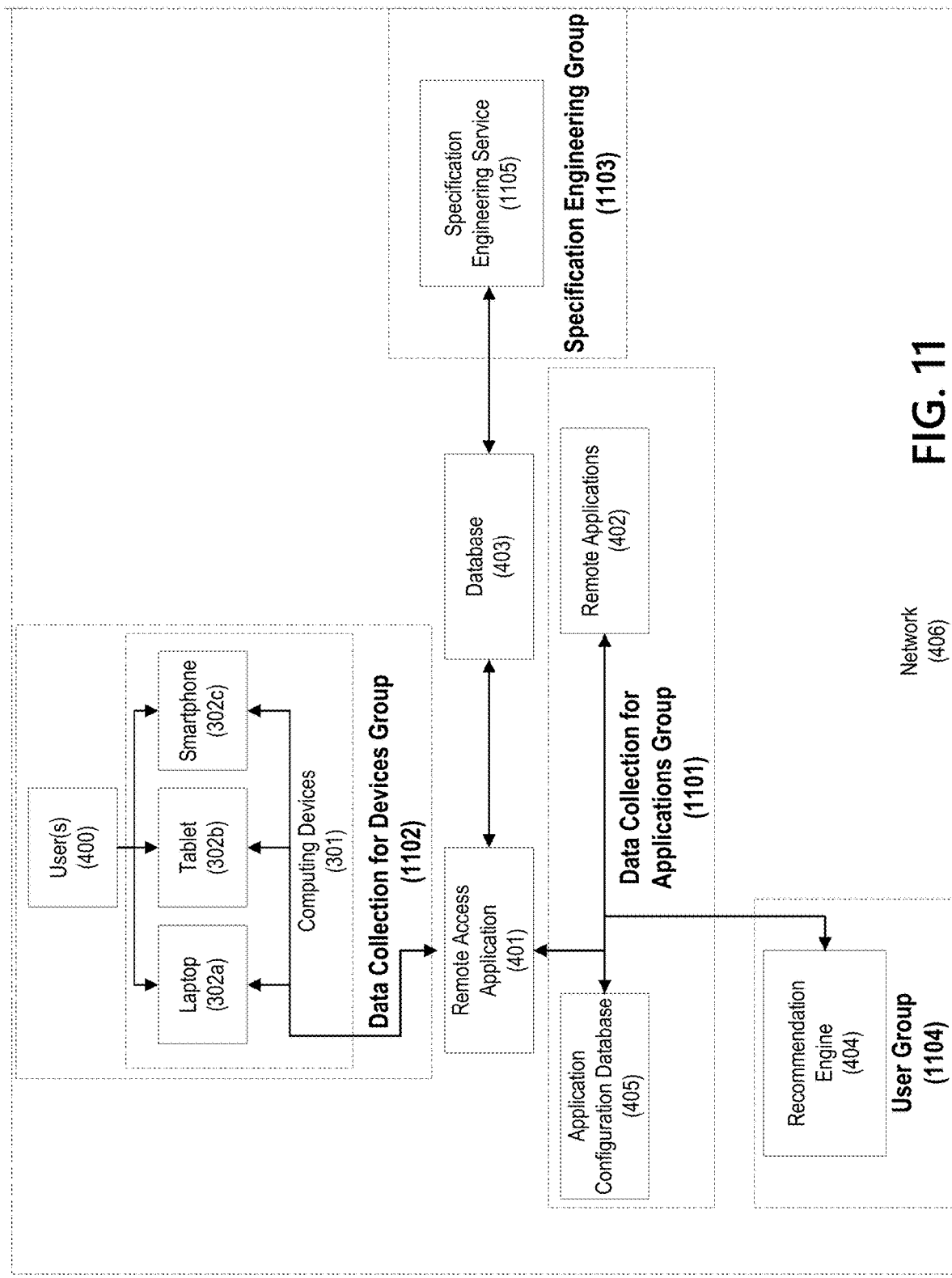
FIG. 11 shows the system for device recommendation, with different elements of the system categorized into four groups.

FIG. 11 presents similar elements of FIG. 4, albeit represented in different groups: a data collection for applications group 1101, a data collection for devices group 1102, an attribute engineering group 1103, and a user group 1104. The data collection for applications group 1101 may be implemented using the configuration database 405 and the remote applications 402. The data collection for devices group 1102 may implemented using the computing devices 301 (such as the laptop 302a, the tablet 302b, and the smartphone 302c) and the users 400. The attribute engineering group 1103 may performed or otherwise conducted using an attribute service 1105. The attribute service 1105 may be configured to cause storage of the device attributes 303 for the computing devices 301 (e.g., the computing device attributes) and/or the applications 305 (e.g., the application resource requirements) in the database 403. The user group 1104 may be implemented with the recommendation engine 404.

Figure 12:
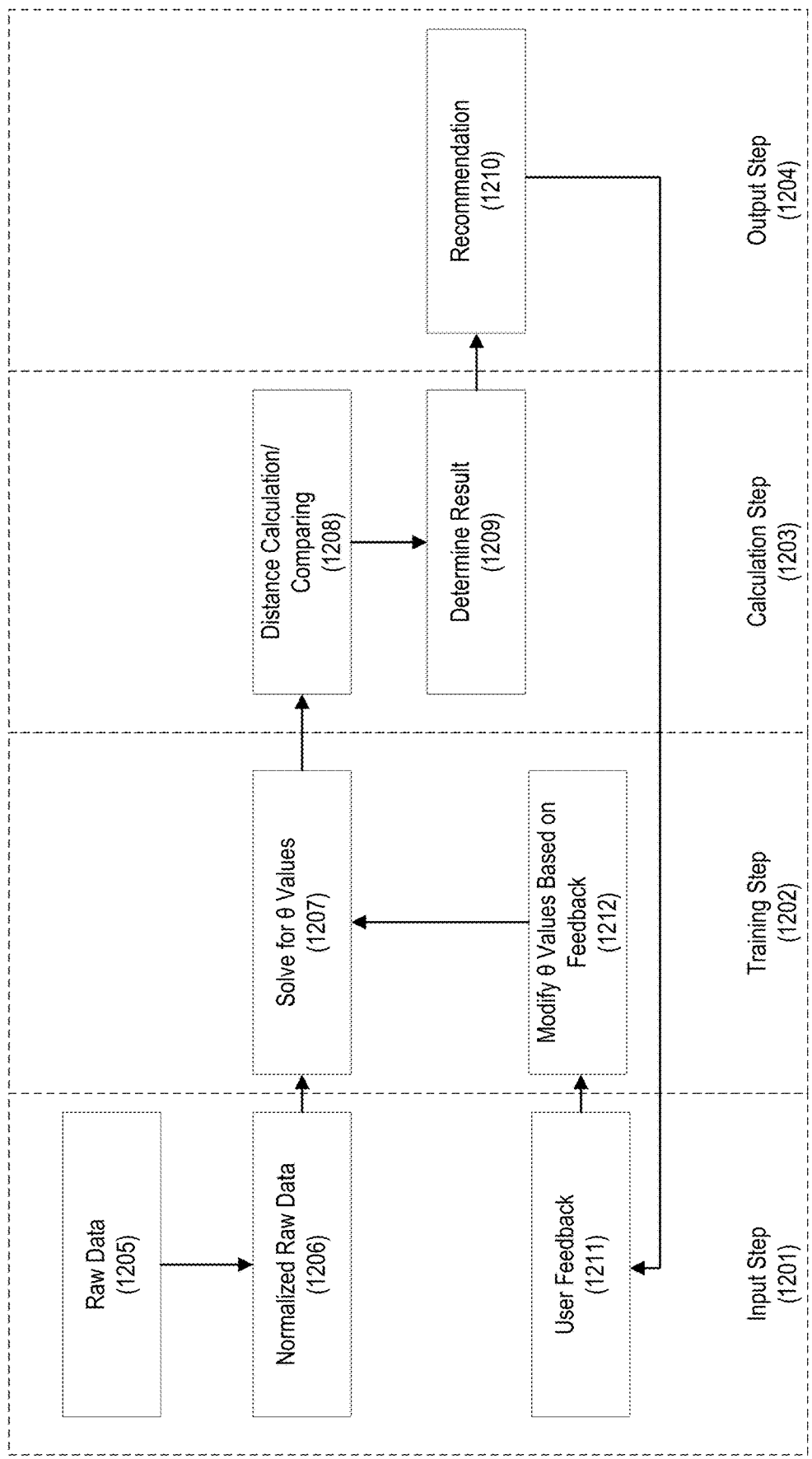
FIG. 12 depicts a machine learning process for providing device recommendations.

FIG. 12 depicts a process for improving recommendations using machine learning techniques. The process shown in FIG. 12 may be used to, e.g., improve recommendations using a value that is based on historical user feedback. The process may comprise four steps: an input step 1201, a training step 1202, a calculation step 1203, and an output step 1204.

During the input step 1201, raw data 1205 may be determined. Such raw data may include, e.g., distance between vectors (e.g., as depicted in FIG. 8), values (normalized or not) determined for resource requirements associated with one or more applications and/or device attributes for one or more computing devices (e.g., as shown in the tables above), initial values of theta values (e.g., 1, such that all values of theta are unweighted), and the like. The raw data 1205 may be normalized into normalized raw data 1206. Normalization, also discussed above with respect to step 706 of FIG. 7, may be performed to ensure that data across different devices, different applications, and/or different types of data may be readily compared. For example, the device attributes for memory may be an integer indicating the gigabytes of memory available (e.g., 2, 8), whereas the device attributes for resolution may be a number of pixels (e.g., 2,073,600, or 1920×1080). By normalizing these values (e.g., to all be within a range of −1 to 1), various comparison steps (e.g., distance calculation) may be simplified. The normalization process may be the same or similar as that discussed above with regard to FIG. 7. The process may then proceed to the training step 1202.

During the training step 1202, one or more values (referred to as theta (θ)) are solved or otherwise determined. The normalized raw data 1206 may be modified by the theta value(s) to modify the weight of one or more portions of the normalized raw data. This means that, for example, more important device attributes and/or resource requirements (e.g., the presence or absence of a camera) may be prioritized over relatively less important device attributes and/or resource requirements (e.g., resolution). Theta values may also be used to weigh other elements of the raw data, such as the rating of an application in an app store, the frequency with which a computing device/application are used, or the like. During the calculation step 1203, distance calculations and comparisons in step 1208 may be performed using the theta value. Step 1208 is illustrative, and other calculation methods (e.g., those described with respect to step 707 of FIG. 7) may be additionally and/or alternatively used. The calculation step 1203 may then determine a result in step 1209. During the output step 1204, a recommendation 1210 for computing device(s), of a plurality of computing devices, and/or application(s), of a plurality of applications, may be generated. Such steps may be performed using the same or similar techniques as discussed with reference to FIG. 7.

The process may return to the input step 1201, where the user feedback (which may be the same or similar as the user feedback 1001) may be received and/or otherwise determined. Then, in the training step 1202, the theta value(s) 1212 may be modified based on the user feedback 1211. As such, the user feedback 1211 may be used to modify the theta value, thereby modifying the weights of device attributes. Additionally and/or alternatively, historical use of an application may be used to modify the theta value(s) 1212. For example, historical use of an application on one or more computing devices may suggest that, though the application indicates that it requires 2 gigabytes of random access memory, at least 4 gigabytes are in fact required for optimal operation. Such historical use may be monitored by the one or more computing devices and, e.g., stored in the configuration database 405. The use of such machine learning techniques may advantageously allow change or otherwise adjust values of various computing device attributes, such that, e.g., optional resource requirements which matter more to a user may be weighted more highly than other optional resource requirements.

Figure 13:
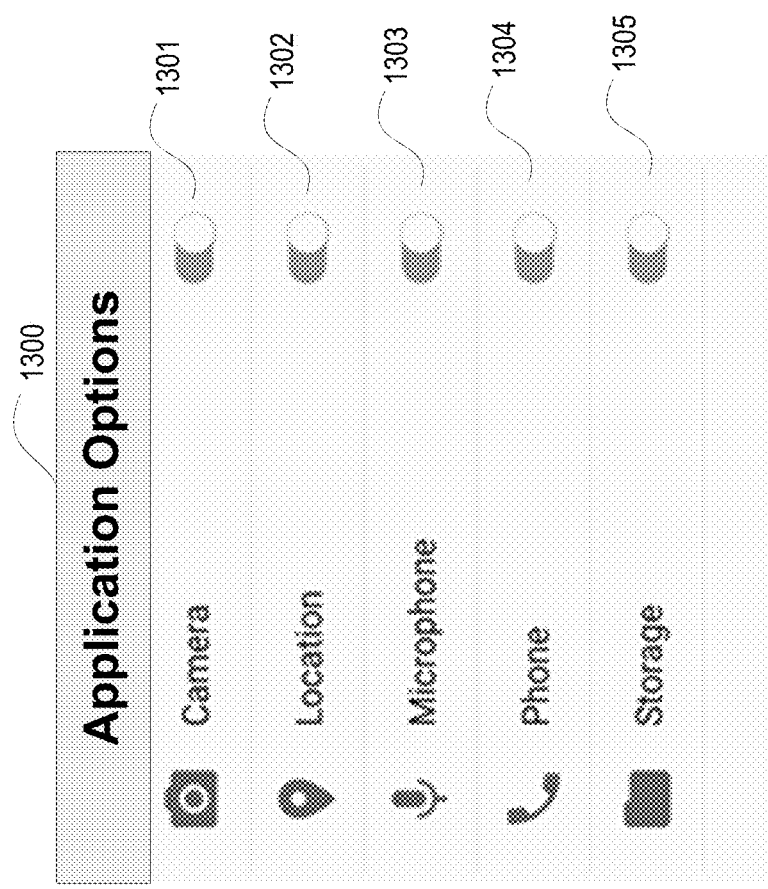
FIG. 13 shows an application options menu for permitting device attributes.

FIG. 13 shows an application options menu 1300 configured to permit a user to specify which device attributes may be used for one or more computing devices. The camera option 1301, location option 1302, microphone option 1303, phone option 1304, and storage option 1305 may all be toggled by a user. Toggling such options may permit a user to enable and/or disable one or more functions of a computing device, such that computing device attributes for the computing device may change. For example, a user toggling the camera option 1301 off may cause the computing device to indicate that it does not have a camera when polled for its computing device attributes, even though a camera is otherwise physically installed to the computing device.

Figure 14:
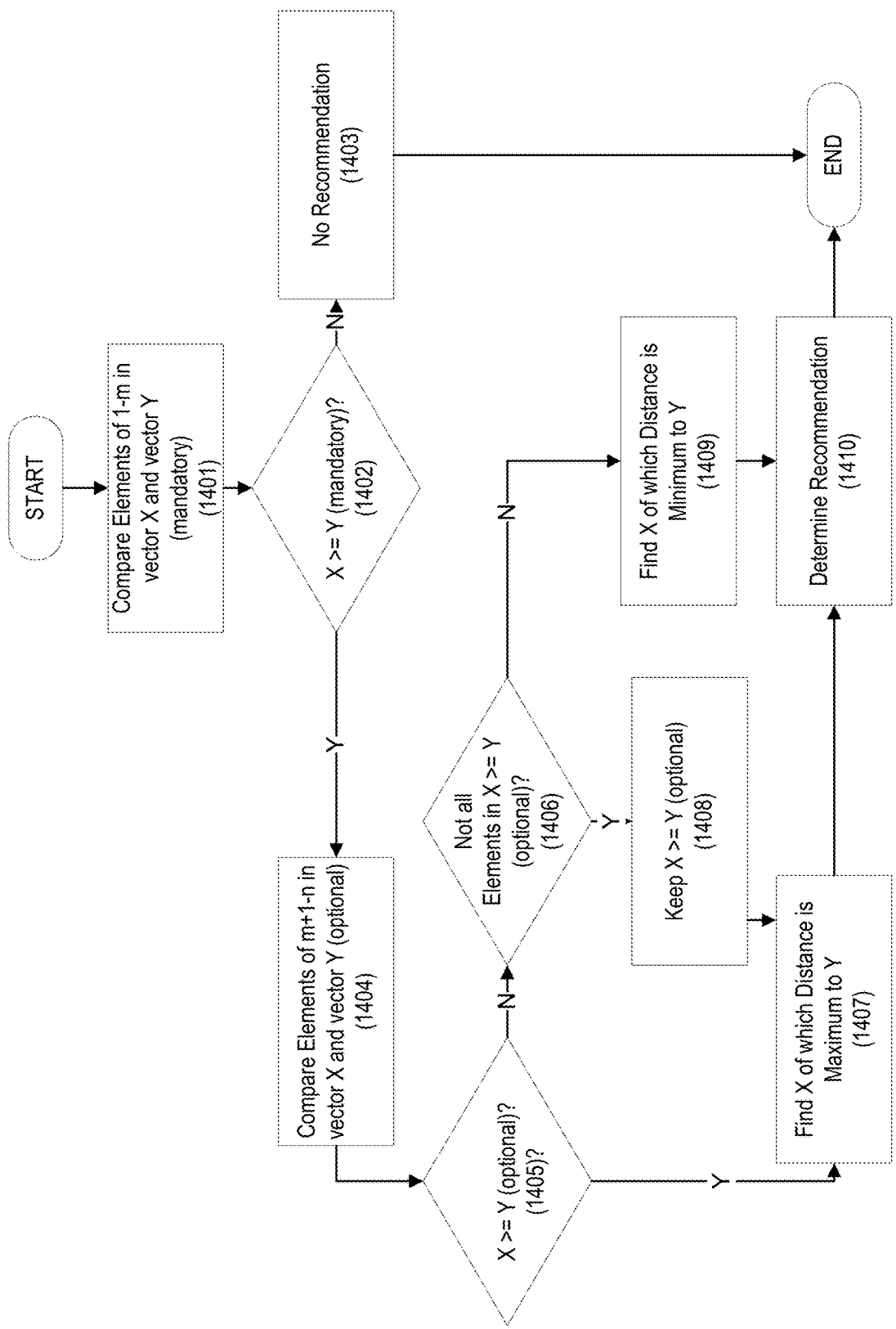
FIG. 14 shows a flow chart for recommending devices using vectors of computing device attributes.

FIG. 14 shows a flow chart for recommending devices for executing a particular application using vectors of computing device attributes and resource requirements, particularly where the resource requirements are classified as mandatory and/or optional. As used in this flow chart, vector X refers to one or more computing device attributes (which may be in any format, though are referred to in FIG. 14 as vectors for simplicity), and vector Y refers to resource requirements for a single application (which may also be in any format, though are referred to in FIG. 14 as vectors for simplicity). FIG. 14 divides the resource requirements into mandatory and optional resource requirements for illustrative purposes; however, all or none of the resource requirements may be mandatory and/or optional. In step 1401, elements of vector X and the mandatory elements of vector Y are compared. This process may be the same or similar as described with respect to step 703 of FIG. 7. In step 1402, if vector X is greater than or equal to Y (mandatory) such that there are multiple computing devices with corresponding computing device attributes that are sufficient to meet an application's mandatory resource requirements, the flow chart proceeds to step 1404. Otherwise the flow chart proceeds to step 1403, where no recommendation is made. Such a result may occur where, for example, no computing device, of a plurality of computing devices, is capable of executing an application.

In step 1404, elements of vector X and optional elements of vector Y are compared to determine whether there are devices which satisfy the optional resource requirements. In step 1405, if vector X is greater than or equal to Y (optional) such that there are computing devices with computing device attributes that are sufficient to meet the optional resource requirements, then the flow chart proceeds to step 1407. Otherwise, the flow chart proceeds to step 1406.

In step 1406, it is determined whether not all computing devices in vector X correspond to vector Y, such that some computing devices satisfy all optional resource requirements whereas other computing devices do not. If this is the case, the flow chart proceeds to step 1408. Otherwise the flow chart proceeds to step 1409.

In step 1408, computing devices from vector X are selected which satisfy the optional portions of vector Y. In other words, since not all computing devices satisfy the optional resource requirements, such non-satisfying computing devices are removed from consideration. This results in vector X corresponding only to computing devices which satisfy the mandatory application resource requirements and the optional resource requirements. The flow chart then proceeds to step 1407.

In step 1409, a computing device is determined from vector X which is a minimum distance to Y. In this circumstance, not all computing devices satisfy all optional resource requirements, so a best efforts recommendation may be made. In this circumstance, the computing device corresponding to the least distance from a point corresponding to the application resource requirements in vector Y may be determined. Such a computing device may be the best recommendation available, even if the computing device does not meet all optional resource requirements. This process may be similar to that depicted for step 706 in FIG. 7.

In step 1407, a computing device in vector X is determined which has a maximum distance from vector Y. This step may be performed where multiple computing devices exceed the application resource requirements of an application, so finding the best computing device may comprise selecting a most powerful and/or capable computing device from a plurality of computing devices. This process may be similar to that depicted for step 706 in FIG. 7. The flow chart then proceeds to step 1410.

In step 1410, a recommendation is determined. Determining the recommendation may be the same or similar as described with respect to step 707. For example, a recommendation of a computing device for executing a particular application may be transmitted to a user.

Figure 15:
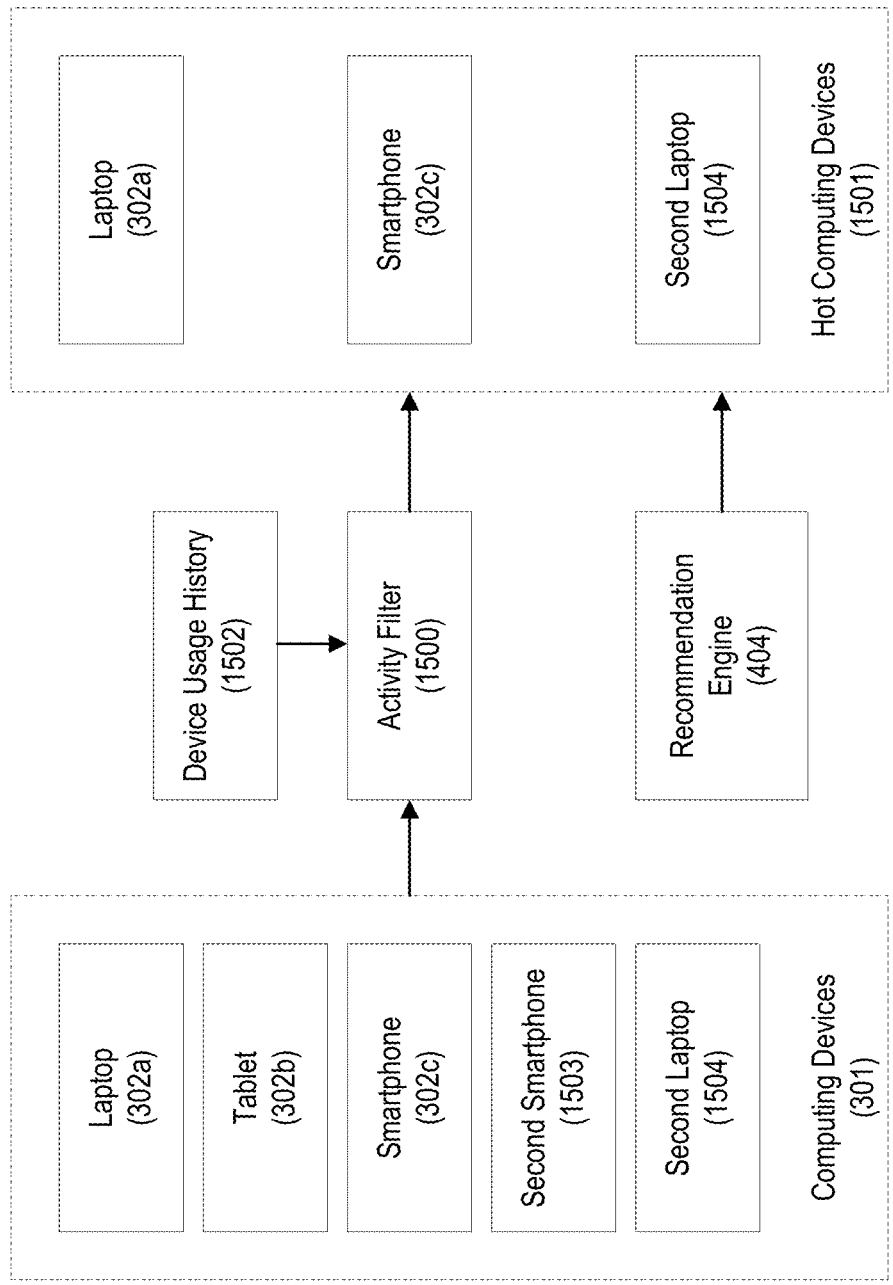
FIG. 15 shows an activity filter which filters hot computing devices from computing devices based on a device usage history.

FIG. 15 shows an activity filter 1500 which uses a device usage history 1502 to filter the computing devices 301 to determine hot computing devices 1501, where such hot computing devices correspond to computing devices frequently/recently used by a user. As shown in FIG. 15, the computing devices 301 may include the laptop 302a, the tablet 302b, the smartphone 302c, the second smartphone 1503, and the second laptop 1504. Such devices may be available to a user because, e.g., they are in the same home/office of a user, are listed in a database as available to the user, or the like. Use of the computing devices 301 may be tracked and reflected in the device usage history 1502. Tracking may be accomplished by causing an operating system on one or more of the computing devices 301 to record user activity, by monitoring a network used by one or more of the computing devices 301, or the like. For example, the device usage history 1502 may indicate a frequency of use of the computing devices 301, the last time one or more of the computing devices 301 were used, or the like. Based on the device usage history 1502, the activity filter 1500 may determine hot computing devices 1501, which comprise the laptop 302a, the smartphone 302c, and the second laptop 1504. Such computing devices may be regularly used by the user, or otherwise be presumed to be available to the user due to their frequency and/or regency of use.

The activity filter 1500 may additionally and/or alternatively be configured to filter devices based on geographic proximity. The computing devices 301 may be filtered to the hot computing devices 1501 based on their proximity to one or more users. For example, the device usage history 1502 may indicate that the tablet 302b is located in a different office than an office where a user is located, such that the tablet 302b is filtered and not listed as part of the hot computing devices 1501. Such geographic proximity filtering may be based, in part, on a time period (e.g., a device switching cost) associated with a user retrieving the device. For example, devices further than a ten minutes' walk from a user may be filtered using a predetermined threshold. This geographic proximity filtering may advantageously ensure that devices are not recommended which are not reasonably close to the user.

The recommendation engine 404 may determine computing device attributes for the hot computing devices 1501, rather than all of the computing devices 301. This may advantageously speed up the recommendation process.

Figure 16:
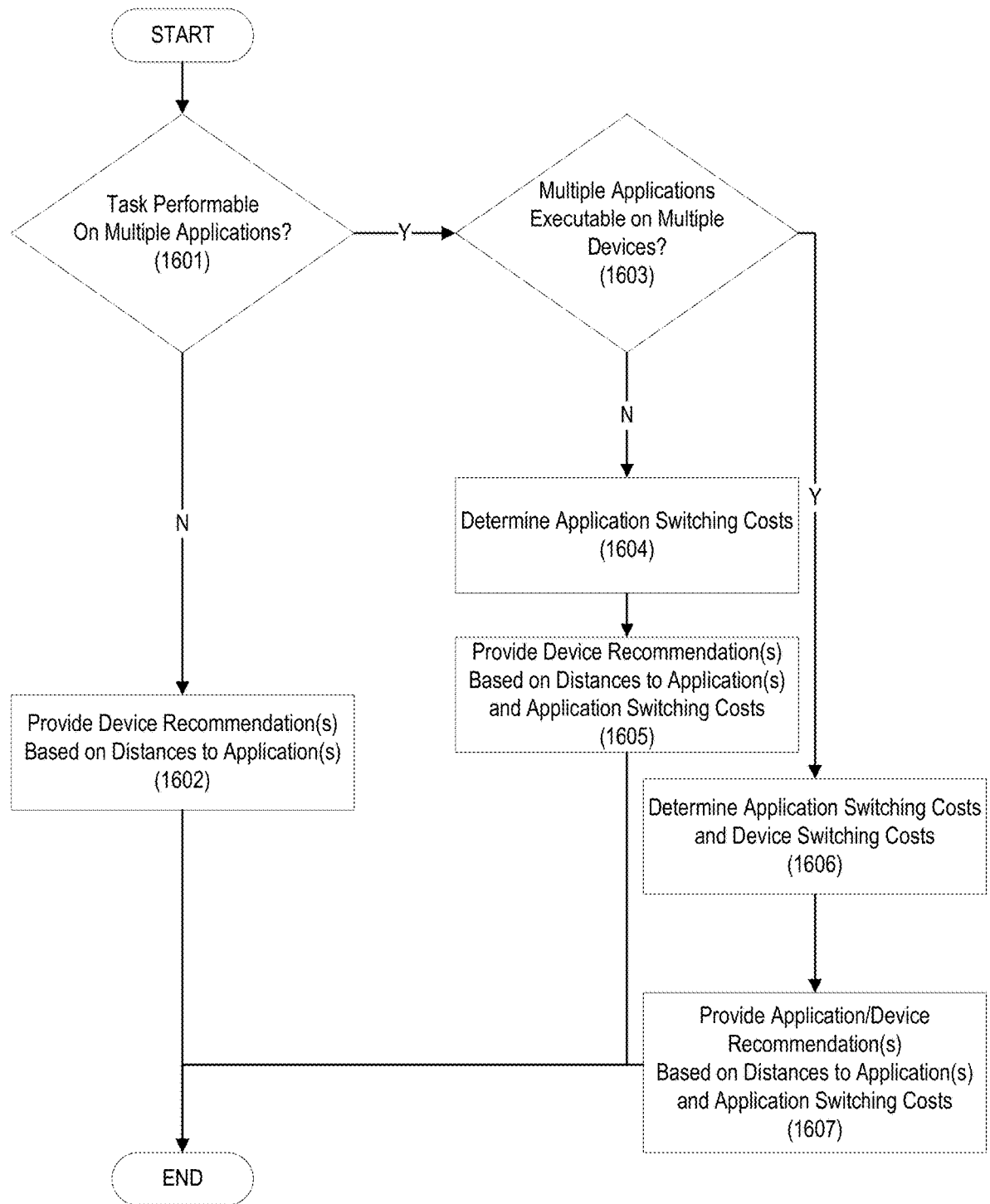
FIG. 16 shows how the availability of different applications and computing devices may affect a recommendation

FIG. 16 shows how the availability of different applications and computing devices may affect a recommendation. In step 1601, it is determined whether a task may be performed by multiple applications. Information about a task, including applications which may perform the task, may be stored in a database (e.g., the database 403). For example, such a database may indicate that a task involving changing a color image to black-and-white may be performed using a photo viewer application, a photo editor application, or a web browser (which may execute an online photo editor application website). Such a database may be queried to determine one or more applications which may perform a task. If only one application is capable of performing a task, in step 1602, a device recommendation is provided based on the distance formulae method described above in relation to FIG. 14. If the task may be performed by multiple applications, in step 1603, it is determined whether the multiple applications may be executed on multiple devices. Such a determination may be made by querying the same or a similar database as described with respect to step 1601. For example, a database may indicate that certain applications may be executed on certain computing devices, and that database may be queried to collect a list of one or more devices which may execute one or more applications to perform a task. Such multiple devices may be the filtered devices as described with respect to FIG. 15. If not, then application switching costs are determined in step 1604, and the flow chart proceeds to provide device recommendations based on distances to those applications and the determined switching costs in step 1605. As also described above, application switching costs may comprise any time costs and/or negative user experience effects associated with one or more users switching from one or more first applications to one or more second applications. For example, a five second time period associated from switching from a first application to a second application may be an application switching cost. As such, the distances calculated may treat application switching costs like other variables, albeit with the recognition that lower application switching costs are preferred. The device recommendations based on the distances to applications and application switching costs in step 1605 may be the same or similar as described with respect to FIG. 7. For example, the application switching costs may be considered part of the resource requirements, and the process may prefer lower application switching costs over greater application switching costs. If the multiple applications may be executed on multiple devices, in step 1606, application switching costs determined in step 1604 and device switching costs are determined in step 1606. As also described above, device switching costs may comprise any time costs and/or negative user experience effects associated with one or more users switching from one or more first computing devices to one or more second computing devices. As such, step 1606 may be the same or similar as step 1604, except both application switching costs and device switching costs are determined in step 1606. In step 1607, a recommendation is provided based on the application and/or device switching costs and/or the distances between the application resource requirements and the device attributes. All recommendation processes (e.g., steps 1602, 1605, and/or 1607) may be looped and/or repeated as necessary for different tasks and/or steps in a task. The flow chart then ends.

Figure 17:
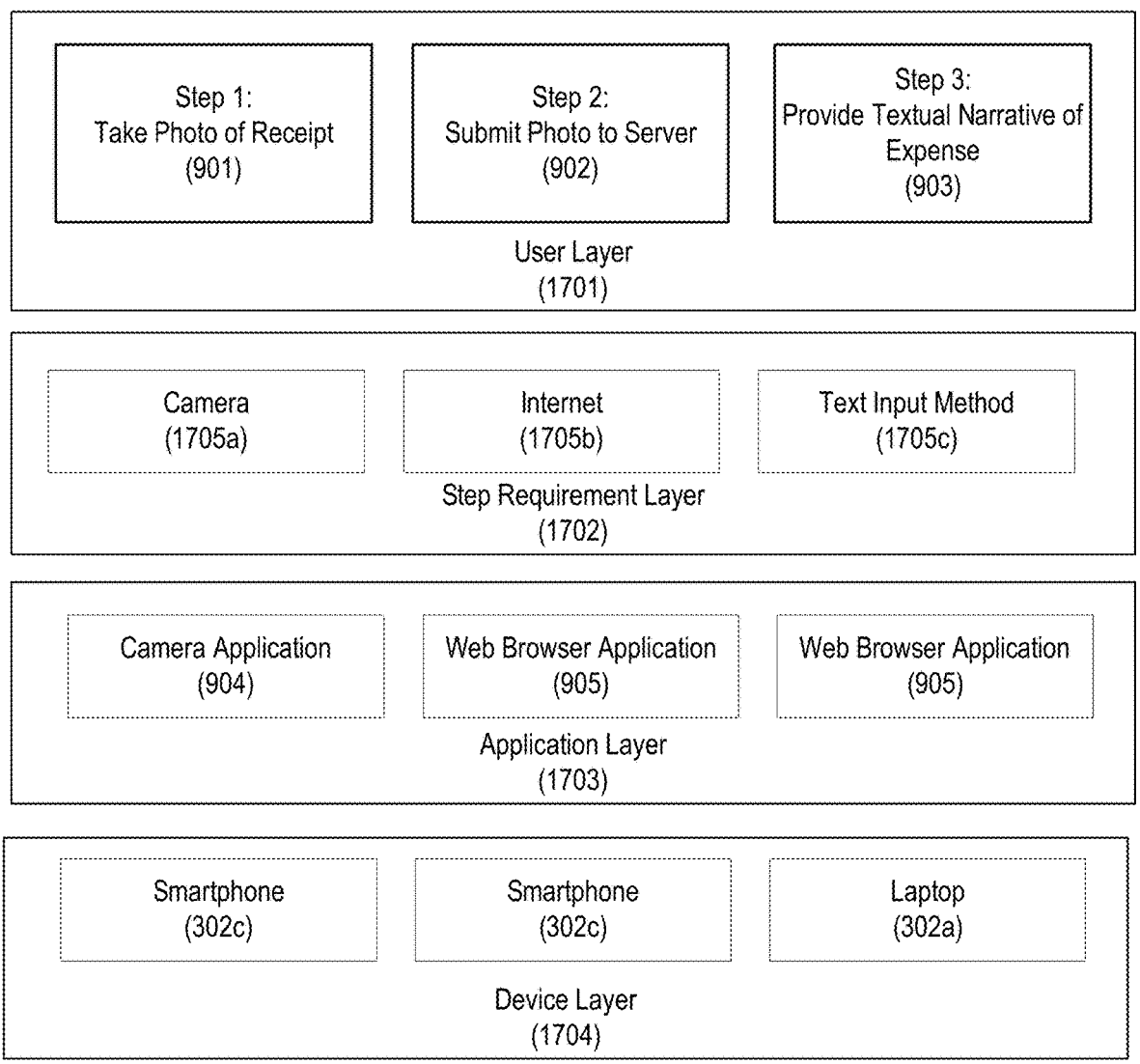
FIG. 17 illustrates a recommendation as a series of layers

FIG. 17 illustrates a recommendation as a series of layers. A recommendation, such as the recommendation 900 shown in FIG. 9, may be broken into four layers: a user layer 1701, a step requirement layer 1702, an application layer 1703, and a device layer 1704.

These layers are provided for illustration purposes to show the interrelations between steps, step requirements, applications, and devices, and in practice steps, computing devices, and applications need not be grouped in any particular manner. The user layer 1701 may comprise steps of a task which must be performed by the user, such as the first step 901 (taking a photo), the second step 902 (uploading the photo), and the third step 903 (providing a textual narrative for the photo). The user layer may correspond to instructions given to the user, such that the first step 901 may be associated with the camera application 904 and the smartphone 302*c* (such that, for example, a user interface relating to the first step 901 may also display an indication of the camera application 904 and/or an indication of the smartphone 302*c*). The step requirement layer 1702 may indicate step requirements for each step of the task, such as requiring a camera 1705*a* for the first step 901, requiring the Internet 1705*b* for the second step 902, and requiring a textual input method 1705*c* for the third step 903. For example, a user interface may indicate to a user that the user is to use the camera application 904 on the smartphone 302*c* for the first step 901, the web browser application 905 on the smartphone 302*c* for the second step 902, and the web browser application 905 on the laptop 302*a* for the third step 903.

Figure 18:
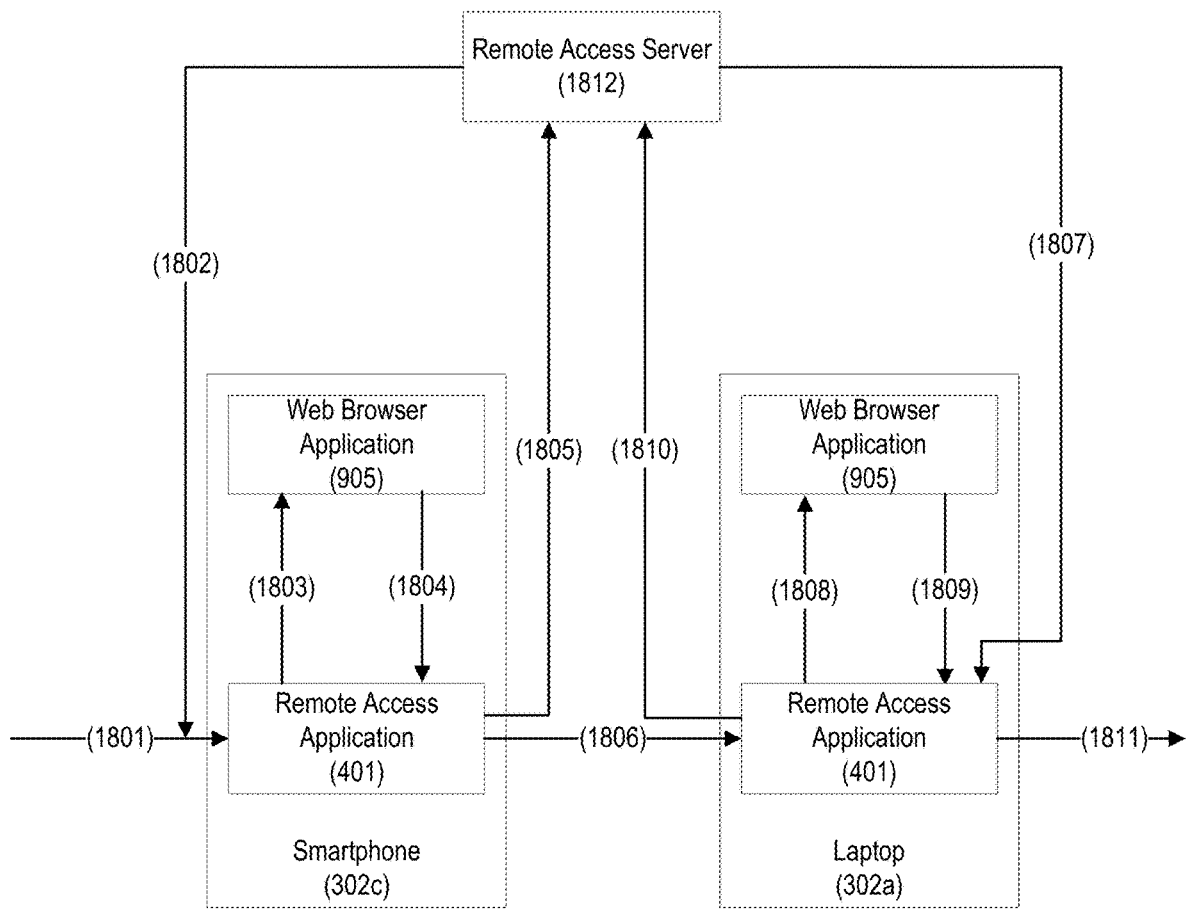
FIG. 18 depicts steps for how switches from applications and/or devices may be performed in a remote access environment

FIG. 18 depicts steps for how to switch from applications and/or devices may be performed in a remote access environment. The smartphone 302*c* and the laptop 302*a* may both execute a copy of the remote access application 401 and the web browser application 905. In step 1801, the remote access application 401 executing on the smartphone 302*c* may receive data or information (e.g., a notification generated in response to a previous step in a task, a user opening an application, or the like). In step 1802, the remote access application 401 executing on the smartphone 302*c* may receive state information from a remote access server 1812. Such state information may indicate metadata about a task (e.g., which steps have already been performed), application(s) for execution on the smartphone 302*c*, remote application raw data (e.g., graphical information relating to a previous task), or the like. In step 1803, based on the received data and the state information, the remote access application 401 executing on the smartphone 302*c* may cause execution of the web browser application 905. The web browser application 905 may be a remote access application executed remotely on the remote access server 1812. Based on that execution, in step 1804, the remote access application 401 executing on the smartphone 302*c* may receive output data which may, in step 1805, be sent to the remote access server 1812. That output data may be any application output data, such as an indication that a step has been complete, data required for the next step, or the like. For example, if a first step relates to downloading an image and a second step relates to processing the image, then the output data for the first step may comprise the downloaded image, and the output data for the second step may comprise the processed image. This process may continue until a step is complete. Then, in step 1806, a notification may be transmitted to the remote access application 401 executing on the laptop 302*a*. The remote access application 401 executing on the laptop 302*a* may receive state information from the remote access server 1812 in step 1807. In step 1808, based on the received notification and the state information, the remote access application 401 executing on the laptop 302*a* may cause execution of the web browser application 905. Based on that execution, in step 1809, the remote access application 401 executing on the laptop 302*a* may receive output data which may, in step 1810, be sent to the remote access server 1812. Then, in step 1811, if the task has more steps, another notification may be sent to another computing device. Additionally and/or alternatively, another notification may cause execution of another application on the laptop 302*a*, and/or may inform the user that the task has been completed. As such, the process shown in FIG. 18 may be repeated as necessary across multiple device switches.

Figure 19:
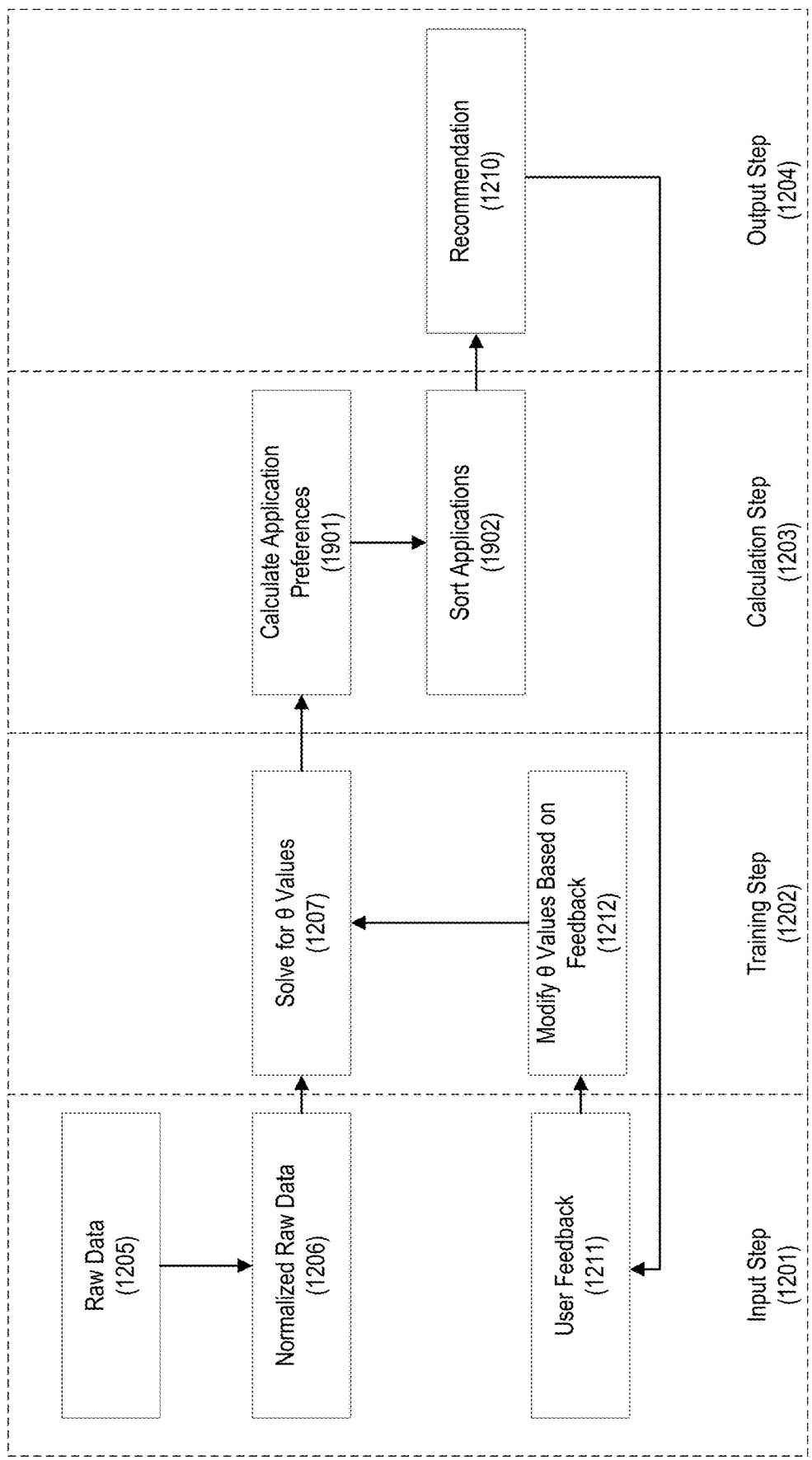
FIG. 19 depicts a process for improving device recommendations using machine learning techniques that has been modified to determine application preferences.

FIG. 19 depicts a process for improving device recommendations using machine learning techniques that has been modified to determine application preferences. FIG. 12 particularly may be used to determine theta values for weighting application recommendations. The input step 1201, training step 1202, and output step 1204 are the same as shown in FIG. 12. The calculation step 1203 has been modified to include a step of calculating application preferences 1901. Such a step may be performed using publicly-available data, such as ratings of applications in an app store on an operating system. Additionally and/or alternatively, such preferences may be determined using a frequency with which applications are used by a user. Using such preferences, a preference index may be determined for each app in the manner described in FIG. 7. Using these preference indexes, an application sorting step 1902 may be performed. For example, applications may be sorted from the highest to the lowest preference. Based on this sorting, the recommendation 1210 may be provided in the output step 1204. As described in FIG. 12, theta values weighting these preference indexes may be modified in the training step 1202 and based on the user feedback 1211 in the input step 1201.

The following paragraphs (M1) through (M20) describe examples of methods that may be implemented in accordance with the present disclosure.

(M1) A method comprising determining, by a computing device, attributes for a plurality of endpoint devices, wherein the plurality of endpoint devices are associated with a user and are configured to access at least one application; determining, by the computing device, resources to enable one or more functions of the at least one application; selecting, by the computing device and based on a comparison of the determined attributes and the resources, an endpoint device from the plurality of endpoint devices; and transmitting, by the computing device, a recommendation to the user, wherein the recommendation identifies the selected endpoint device as a preferred device on which to access the at least one application.

(M2) A method may be performed as described in paragraph (M1) wherein the comparison of the determined attributes and the resources comprises modifying, based on a value determined based on historical user feedback, the determined attributes and the resources.

(M3) A method may be performed as described in paragraph (M2) wherein the method further comprises receiving an indication of whether the user used the selected endpoint device to access the at least one application; and modifying, based on the indication, the value.

(M4) A method may be performed as described in any of paragraphs (M1) through (M3) wherein the comparison of the determined attributes and the resources comprises normalizing the determined attributes and the resources; and determining a distance between a first vector associated with the determined attributes and a second vector associated with the resources.

(M5) A method may be performed as described in any of paragraphs (M1) through (M4) wherein the at least one application is a remote application, and wherein the plurality of endpoint devices are capable of accessing the at least one application remotely via a remote access application.

(M6) A method may be performed as described in any of paragraphs (M1) through (M5) wherein the method further comprises determining second resources to enable one or more optional functions of the at least one application, and wherein selecting the endpoint device from the plurality of endpoint devices is further based on a second comparison of the determined attributes and the second resources.

(M7) A method may be performed as described in any of paragraphs (M1) through (M6) wherein the method further comprises filtering, based on the resources, the plurality of endpoint devices.

(M8) A method may be performed as described in any of paragraphs (M1) through (M7) wherein determining the resources is responsive to receiving an indication that the user intends to use the at least one application.

(M9) A method may be performed as described in any of paragraphs (M1) through (M8) wherein determining the attributes for the plurality of endpoint devices comprises transmitting, to a first endpoint device of the plurality of endpoint devices, a request for first attributes; and receiving, from the first endpoint device, the first attributes.

(M10) A method may be performed as described in any of paragraphs (M1) through (M9) further comprising weighting the determined attributes and the resources based on historical use of the application.

(M11) A method comprising determining, by a computing device, a plurality of steps of a task, the task to be completed using one or more endpoint devices; selecting, by the computing device, an application to execute at least one step of the plurality of determined steps based on attributes of the at least one step and the selected application; identifying, by the computing device, an endpoint device, from a plurality of endpoint devices, that includes the selected application; and generating, by the computing device, a workflow for accomplishment of the task by a user with the one or more endpoint devices, wherein the workflow identifies the identified endpoint device and the selected application on which to execute the at least one step of the plurality of determined steps so as to perform at least a portion of the task.

(M12) A method may be performed as described in paragraph (M11) wherein selection of the endpoint device comprises comparing attributes of the endpoint device with the resource requirements of the application.

(M13) A method may be performed as described in paragraph (M12) wherein the comparing the attributes of the endpoint device with the resource requirements of the application comprises normalizing the attributes and the resource requirements; and determining a distance between a first vector associated with the attributes and a second vector associated with the resource requirements.

(M14) A method may be performed as described in any of paragraphs (M10) through (M13) wherein the comparing the attributes of the endpoint device with the resource requirements of the application comprises determining, using a database, a frequency of use of the application.

(M15) A method may be performed as described in any of paragraphs (M10) through (M14) wherein the method further comprises receiving an indication of use of the selected endpoint device to access the application; modifying, based on the indication, a weighting value; and modifying, based on the weighting value, the resource requirements of the application.

(M16) A method may be performed as described in any of paragraphs (M10) through (M15) wherein the workflow further identifies a second endpoint device and a second application on which to execute at least one second step of the plurality of determined steps.

(M17) A method may be performed as described in any of paragraphs (M10) through (M16) further comprising determining second resource requirements to enable operation of one or more optional functions of the application, wherein selection of the endpoint device is based on a second comparison of attributes of the endpoint device and the second resource requirements.

(M18) A method may be performed as described in any of paragraphs (M10) through (M17) further comprising filtering, based on a history of use of the plurality of endpoint devices, the plurality of endpoint devices to determine a second plurality of endpoint devices, wherein identifying the endpoint device comprises identifying the endpoint device from the second plurality of endpoint devices.

(M19) A method may be performed as described in any of paragraphs (M10) through (M18) wherein the determination of the plurality of steps is responsive to receipt of an indication that the user intends to complete the task.

(M20) A method may be performed as described in any of paragraphs (M10) through (M19) wherein the selection of the application comprises transmitting, to a database, a request for the resource requirements of the application; and receiving, from the database, the resource requirements of the application.

The following paragraphs (A1) through (A10) describe examples of apparatuses that may be implemented in accordance with the present disclosure.

(A1) An apparatus comprising one or more processors; and memory storing instructions that, when executed by the one or more processors, cause the apparatus to determine attributes for a plurality of endpoint devices, wherein the plurality of endpoint devices are associated with a user and are configured to access at least one application; determine resources to enable one or more functions of the at least one application; select, based on a comparison of the determined attributes and the resources, an endpoint device from the plurality of endpoint devices; and transmit a recommendation to the user, wherein the recommendation identifies the selected endpoint device as a preferred device on which to access the at least one application.

(A2) An apparatus as described in paragraph (A1) wherein the instructions, when executed by the one or more processors, further cause the apparatus to compare the determined attributes and the resources by modifying, based on a value determined based on historical user feedback, the determined attributes and the resources.

(A3) An apparatus as described in paragraph (A2) wherein the instructions, when executed by the one or more processors, further cause the apparatus to receive an indication of whether the user used the selected endpoint device to access the at least one application; and modify, based on the indication, the value.

(A4) An apparatus as described any of paragraphs (A1) through (A3) wherein the instructions, when executed by the one or more processors, further cause the apparatus to compare the determined attributes and the resources by normalizing the determined attributes and the resources; and determining a distance between a first vector associated with the determined attributes and a second vector associated with the resources.

(A5) An apparatus as described any of paragraphs (A1) through (A4) wherein the at least one application is a remote application, and wherein the plurality of endpoint devices are capable of accessing the at least one application remotely via a remote access application.

(A6) An apparatus comprising one or more processors; and memory storing instructions that, when executed by the one or more processors, cause the apparatus to determine a plurality of steps for completion of a task; select a first application, of one or more applications, for performing a first step of the plurality of steps by comparing requirements associated with the first step with resource requirements of the first application; select an endpoint device, from a plurality of endpoint devices, for executing the first application; and transmit a recommendation to a user, wherein the recommendation identifies, for performance of the first step, the selected endpoint device and the first application.

(A7) An apparatus as described in paragraph (A6) wherein the instructions, when executed by the one or more processors, further cause the apparatus to select the endpoint device by comparing attributes of the endpoint device with the resource requirements of the first application.

(A8) An apparatus as described in paragraph (A7) wherein the instructions, when executed by the one or more processors, further cause the apparatus to compare the attributes of the endpoint device with the resource requirements of the first application by normalizing the attributes and the resource requirements; and determining a distance between a first vector associated with the attributes and a second vector associated with the resource requirements.

(A9) An apparatus as described any of paragraphs (A6) through (A8) wherein the instructions, when executed by the one or more processors, further cause the apparatus to receive an indication of whether the user used the selected endpoint device to access the first application; modify, based on the indication, a weighting value; and modify, based on the weighting value, the resource requirements of the first application.

(A10) An apparatus as described any of paragraphs (A6) through (A9) wherein the first application is a remote application, and wherein the plurality of endpoint devices are capable of accessing the first application remotely via a remote access application.

The following paragraphs (CRM1) through (CRM10) describe examples of computer-readable media that may be implemented in accordance with the present disclosure.

(CRM1) A non-transitory computer-readable medium storing instructions that, when executed, cause determining attributes for a plurality of endpoint devices, wherein the plurality of endpoint devices are associated with a user and are configured to access at least one application; determining resources to enable one or more functions of the at least one application; selecting, based on a comparison of the determined attributes and the resources, an endpoint device from the plurality of endpoint devices; and transmitting a recommendation to the user, wherein the recommendation identifies the selected endpoint device as a preferred device on which to access the at least one application.

(CRM2) The non-transitory computer-readable medium described in paragraph (CRM1) wherein the comparison of the determined attributes and the resources comprises modifying, based on a value determined based on historical user feedback, the determined attributes and the resources.

(CRM3) The non-transitory computer-readable medium described in paragraph (CRM2) wherein the instructions, when executed, further cause receiving an indication of whether the user used the selected endpoint device to access the at least one application; and modifying, based on the indication, the value.

(CRM4) The non-transitory computer-readable medium described in any of paragraphs (CRM1) to (CRM3) wherein the comparison of the determined attributes and the resources comprises normalizing the determined attributes and the resources; and determining a distance between a first vector associated with the determined attributes and a second vector associated with the resources.

(CRM5) The non-transitory computer-readable medium described in any of paragraphs (CRM1) to (CRM4) wherein the at least one application is a remote application, and wherein the plurality of endpoint devices are capable of accessing the at least one application remotely via a remote access application.

(CRM6) A non-transitory computer-readable medium storing instructions that, when executed, cause determining a plurality of steps for completion of a task; selecting a first application, of one or more applications, for performing a first step of the plurality of steps by comparing requirements associated with the first step with resource requirements of the first application; selecting an endpoint device, from a plurality of endpoint devices, for executing the first application; and transmitting a recommendation to a user, wherein the recommendation identifies, for performance of the first step, the selected endpoint device and the first application.

(CRM7) The non-transitory computer-readable medium described in paragraph (CRM6) wherein the instructions, when executed, further cause selecting the endpoint device by comparing attributes of the endpoint device with the resource requirements of the first application.

(CRM8) The non-transitory computer-readable medium described in paragraph (CRM7) wherein the instructions, when executed, further cause the comparing the attributes of the endpoint device with the resource requirements of the first application by normalizing the attributes and the resource requirements; and determining a distance between a first vector associated with the attributes and a second vector associated with the resource requirements.

(CRM9) The non-transitory computer-readable medium described in any of paragraphs (CRM6) to (CRM8) wherein the instructions, when executed, further cause receiving an indication of whether the user used the selected endpoint device to access the first application; modifying, based on the indication, a weighting value; and modifying, based on the weighting value, the resource requirements of the first application.

(CRM10) The non-transitory computer-readable medium described in any of paragraphs (CRM6) to (CRM9) wherein the first application is a remote application, and wherein the plurality of endpoint devices are capable of accessing the first application remotely via a remote access application.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
   collecting, by a computing device and during use of at least one application, data indicating use of the at least one application;
   determining, by the computing device and based on the data, one or more weighting values corresponding to a plurality of different attributes of endpoint devices used to execute the at least one application;
   determining, by the computing device, attributes for a plurality of endpoint devices, wherein the plurality of endpoint devices are associated with a user and are configured to access the at least one application;
   weighting the attributes based on the one or more weighting values;
   determining, by the computing device, resources to enable one or more functions of the at least one application;

selecting, by the computing device and based on a comparison of the weighted attributes and the resources, an endpoint device from the plurality of endpoint devices; and transmitting, by the computing device, a recommendation to the user, wherein the recommendation identifies the selected endpoint device as a preferred device on which to access the at least one application.

2. The method of claim 1, wherein the data comprises user feedback indicating a subjective evaluation of a performance of the at least one application during the use of the at least one application.

3. The method of claim 1, further comprising:
receiving an indication of whether the user used the selected endpoint device to access the at least one application; and
modifying, based on the indication, the one or more weighting values.

4. The method of claim 1, wherein the comparison of the weighted attributes and the resources comprises:
normalizing the weighted attributes and the resources; and
determining a distance between a first vector associated with the weighted and normalized attributes and a second vector associated with the resources.

5. The method of claim 1, wherein the at least one application is a remote application, and wherein the plurality of endpoint devices are capable of accessing the at least one application remotely via a remote access application.

6. The method of claim 1, further comprising:
determining second resources to enable one or more optional functions of the at least one application, wherein selecting the endpoint device from the plurality of endpoint devices is further based on a second comparison of the weighted attributes and the second resources.

7. The method of claim 6, further comprising:
filtering, based on the resources, the plurality of endpoint devices.

8. The method of claim 1, wherein determining the resources is responsive to receiving an indication that the user intends to use the at least one application.

9. The method of claim 1, wherein determining the attributes for the plurality of endpoint devices comprises:
transmitting, to a first endpoint device of the plurality of endpoint devices, a request for first attributes; and
receiving, from the first endpoint device, the first attributes.

10. The method of claim 1, wherein determining the one or more weighting values further comprises:
configuring the one or more weighting values such that more important resource requirements for the at least one application are prioritized over relatively less important resource requirements for the at least one application.

11. An apparatus comprising:
one or more processors; and
memory storing instructions that, when executed by the one or more processors, cause the apparatus to:
collect, during use of at least one application, data indicating use of the at least one application;
determine, based on the data, one or more weighting values corresponding to a plurality of different attributes of endpoint devices used to execute the at least one application;
determine attributes for a plurality of endpoint devices, wherein the plurality of endpoint devices are associated with a user and are configured to access the at least one application;
weight the attributes based on the one or more weighting values;
determine resources to enable one or more functions of the at least one application;
select, based on a comparison of the weighted attributes and the resources, an endpoint device from the plurality of endpoint devices; and
transmit a recommendation to the user, wherein the recommendation identifies the selected endpoint device as a preferred device on which to access the at least one application.

12. The apparatus of claim 11, wherein the data comprises user feedback indicating a subjective evaluation of a performance of the at least one application during the use of the at least one application.

13. The apparatus of claim 11, wherein the instructions, when executed by the one or more processors, further cause the apparatus to:
receive an indication of whether the user used the selected endpoint device to access the at least one application; and
modify, based on the indication, the one or more weighting values.

14. The apparatus of claim 11, wherein the instructions, when executed by the one or more processors, further cause the apparatus to compare the weighted attributes and the resources by:
normalizing the weighted attributes and the resources; and
determining a distance between a first vector associated with the weighted and normalized attributes and a second vector associated with the resources.

15. The apparatus of claim 11, wherein the at least one application is a remote application, and wherein the plurality of endpoint devices are capable of accessing the at least one application remotely via a remote access application.

16. A non-transitory computer-readable medium storing instructions that, when executed, cause:
collecting, during use of at least one application, data indicating use of the at least one application;
determining, based on the data, one or more weighting values corresponding to a plurality of different attributes of endpoint devices used to execute the at least one application;
determining attributes for a plurality of endpoint devices, wherein the plurality of endpoint devices are associated with a user and are configured to access the at least one application;
weighting the attributes based on the one or more weighting values;
determining resources to enable one or more functions of the at least one application;
selecting, based on a comparison of the weighted attributes and the resources, an endpoint device from the plurality of endpoint devices; and
transmitting a recommendation to the user, wherein the recommendation identifies the selected endpoint device as a preferred device on which to access the at least one application.

17. The non-transitory computer-readable medium of claim 16, wherein the data comprises user feedback indicating a subjective evaluation of a performance of the at least one application during the use of the at least one application.

18. The non-transitory computer-readable medium of claim 16, wherein the instructions, when executed, further cause:
- receiving an indication of whether the user used the selected endpoint device to access the at least one application; and
- modifying, based on the indication, the one or more weighting values.

19. The non-transitory computer-readable medium of claim 16, wherein the comparison of the weighted attributes and the resources comprises:
- normalizing the weighted attributes and the resources; and
- determining a distance between a first vector associated with the weighted and normalized attributes and a second vector associated with the resources.

20. The non-transitory computer-readable medium of claim 16, wherein the at least one application is a remote application, and wherein the plurality of endpoint devices are capable of accessing the at least one application remotely via a remote access application.

* * * * *